United States Patent
Chang et al.

(10) Patent No.: US 10,123,275 B2
(45) Date of Patent: Nov. 6, 2018

(54) INFORMATION PROCESSING METHOD AND ELECTRONIC DEVICE SUPPORTING THE SAME

(71) Applicant: Samsung Electronics Co., Ltd., Suwon-si (KR)

(72) Inventors: In Young Chang, Seoul (KR); Dong Ryeol Ryu, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 14/851,294

(22) Filed: Sep. 11, 2015

(65) Prior Publication Data

US 2016/0081028 A1    Mar. 17, 2016

(30) Foreign Application Priority Data

Sep. 12, 2014  (KR) .................. 10-2014-0121367

(51) Int. Cl.
*H04B 1/38* (2015.01)
*H04W 52/02* (2009.01)
*H04M 1/02* (2006.01)

(52) U.S. Cl.
CPC ..... *H04W 52/0251* (2013.01); *H04M 1/0202* (2013.01); *H04W 52/027* (2013.01); *H04W 52/0229* (2013.01); *H04W 52/0274* (2013.01); *Y02D 70/00* (2018.01); *Y02D 70/1222* (2018.01); *Y02D 70/1242* (2018.01); *Y02D 70/1262* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/26* (2018.01)

(58) Field of Classification Search
CPC ........................................................ H04W 4/12
USPC ..................................... 455/575.1, 566, 574
See application file for complete search history.

(56) References Cited

U.S. PATENT DOCUMENTS

| | | | |
|---|---|---|---|
| 2008/0090929 A1 | 4/2008 | Wilson et al. | |
| 2009/0249099 A1 | 10/2009 | Saito | |
| 2010/0227651 A1 | 9/2010 | Kim | |
| 2011/0287753 A1* | 11/2011 | Choi | H04W 52/0274 455/418 |
| 2014/0011487 A1* | 1/2014 | Hwang | G06K 9/00221 455/416 |
| 2015/0074568 A1* | 3/2015 | Kwon | H04M 1/576 715/764 |
| 2015/0172241 A1* | 6/2015 | Sharma | H04L 51/12 709/206 |
| 2015/0185815 A1* | 7/2015 | DeBates | G06F 1/3209 713/320 |

FOREIGN PATENT DOCUMENTS

KR        101320505        10/2013

OTHER PUBLICATIONS

Extended European Search Report issued for EP 15184486.7 dated Jan. 29, 2016, 7 pgs.

* cited by examiner

*Primary Examiner* — Tu X Nguyen

(57) ABSTRACT

An electronic device includes: a first processor; a communication interface configured to receive data; and a second processor configured to display output information to be outputted corresponding to the received data to at least one display when the first processor is in a sleep state.

16 Claims, 20 Drawing Sheets

INFORMATION PROCESSING METHOD AND ELECTRONIC DEVICE SUPPORTING THE SAME

CROSS-REFERENCE TO RELATED APPLICATION(S) AND CLAIM OF PRIORITY

The present application is related to and claims the benefit under 35 U.S.C. § 119(a) of a Korean patent application filed on Sep. 12, 2014 in the Korean Intellectual Property Office and assigned Serial number 10-2014-0121367, the entire disclosure of which is hereby incorporated by reference.

TECHNICAL FIELD

The present disclosure relates to information processing of an electronic device.

BACKGROUND

An electronic device such as an existing smartphone provides various user functions.

When various user functions are managed, a power consumption relating to electronic device management may be increased.

SUMMARY

To address the above-discussed deficiencies, it is a primary object to provide an information processing method for efficient information processing and an electronic device supporting the same.

In accordance with certain embodiments of the present disclosure, an electronic device includes: a first processor; a communication interface configured to receive data; and a second processor configured to provide output information to be outputted according to the received data to at least one display when the first processor is in a sleep state.

In accordance with certain embodiments of the present disclosure, an information processing method includes: receiving data when a first processor is in a sleep state; and providing, by a second processor different from the first processor, output information to be outputted according to the received data to at least one display when the first processor is in a sleep state.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
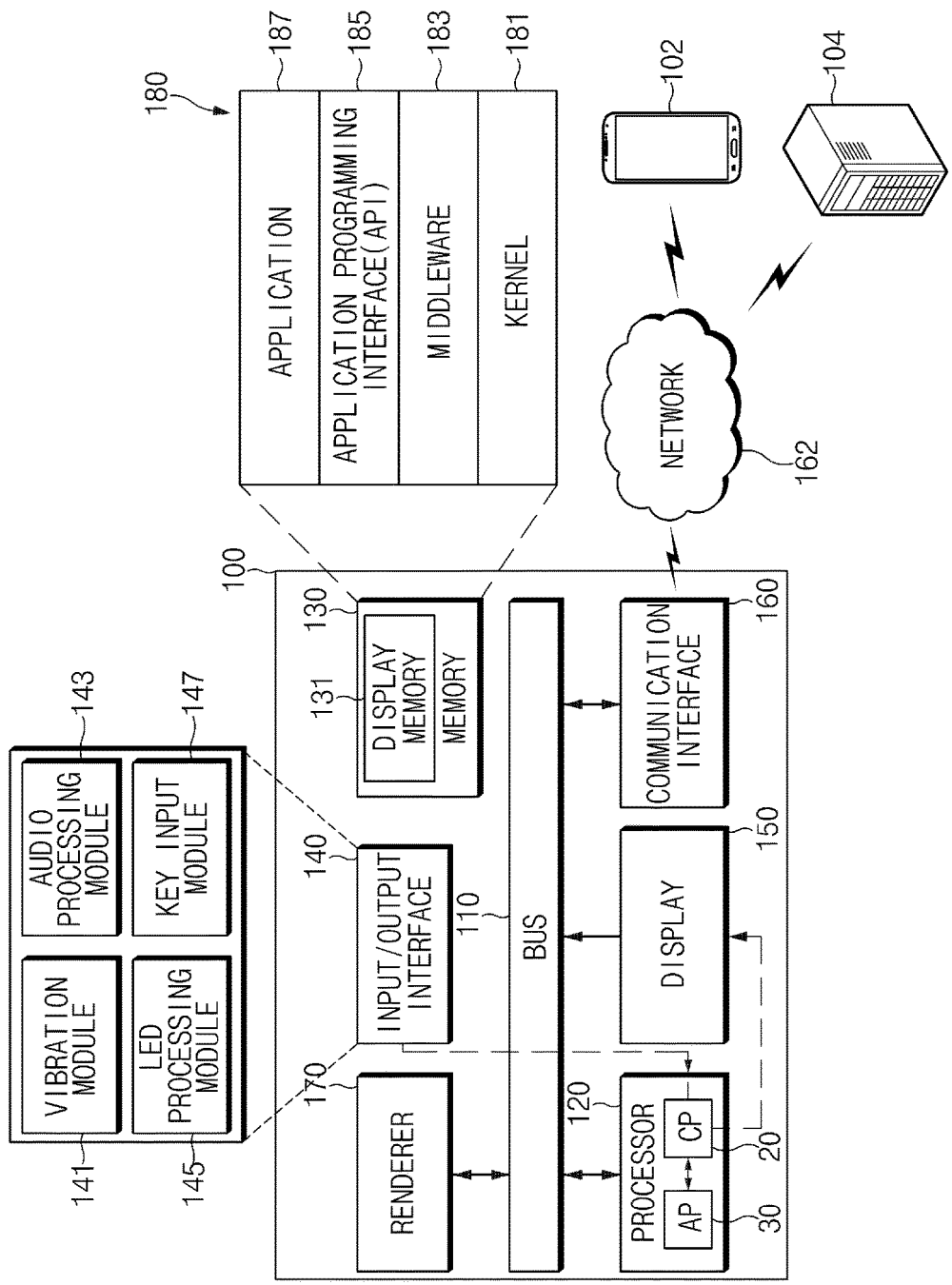
FIG. 1 illustrates a network environment of an electronic device for supporting information processing according to various embodiments of the present disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Hereinafter, various embodiments of the present disclosure are disclosed with reference to the accompanying drawings. However, this does not limit various embodiments of the present disclosure to a specific embodiment and it should be understood that the present disclosure covers all the modifications, equivalents, and/or alternatives of this disclosure provided they come within the scope of the appended claims and their equivalents. With respect to the descriptions of the drawings, like reference numerals refer to like elements.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. The expressions may be used to distinguish one element from another element. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component can be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may mean a dedicated processor (for example, an embedded processor) for performing a corresponding operation or a generic-purpose processor (for example, a CPU or application processor) for performing corresponding operations by executing at least one software program stored in a memory device.

Terms used in various embodiments of the present disclosure are used to describe specific embodiments of the present disclosure, and are not intended to limit the scope of other embodiments. The terms of a singular form may include plural forms unless they have a clearly different meaning in the context. Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any cases, even the terms defined in this specification cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop personal computers (PCs), laptop personal computers (PCs), netbook computers, workstation server, personal digital assistants (PDAs), portable multimedia player (PMPs), MP3 players, mobile medical devices, cameras, and wearable devices (for example, smart glasses, head-mounted-devices (HMDs), electronic apparel, electronic bracelets, electronic necklaces, electronic accessories, electronic tattoos, smart mirrors, and smart watches).

According to some embodiments of the present disclosure, an electronic device may be smart home appliances. The smart home appliances may include at least one of, for example, televisions, digital video disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™ or Google TV™), game consoles (for example, Xbox™ and PlayStation™), electronic dictionaries, electronic keys, camcorders, and electronic picture frames.

According to some embodiments of the present disclosure, an electronic device may include at least one of various medical devices supporting call forwarding service (for example, various portable measurement devices (for example, glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, vehicle head units, industrial or household robots, financial institutions' automatic teller's machines (ATMs), or stores' point of sales (POS) or internet of things (for example, bulbs, various sensors, electric or gas meters, sprinkler systems, fire alarms, thermostats, street lights, toasters, exercise equipment, hot water tanks, heaters, boilers, etc.).

In various embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to the technology development.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

FIG. 1 illustrates a network environment of an electronic device supporting information processing according to various embodiments of the present disclosure.

Referring to FIG. 1, according to various embodiments of the present disclosure, the network environment, for example, may include an electronic device 100, a network 162, another electronic device 102, and a server device 104.

When a first processor (for example, an application processor 30) is in a sleep state, the electronic device 100 in the network environment performs a control to allow a second processor (for example, a communication processor (CP) 20) to have a control of some specified functions of the electronic device 100, thereby performing information processing relating to the management of related functions. According to an embodiment of the present disclosure, when the application processor 30 of the electronic device 100 is in a sleep state, the CP 20 may display information processed according to a specified function performance on a display 150. Additionally, when the application processor 30 is in a sleep state, the CP 20 may output information processed according to a specified function performance through an audio processing module 143, a vibration module 141, or an LED processing module 145. Additionally, when the application processor 30 is activated, the CP 20 may update information obtained according to a specified function performance. Even when the application processor 30 is in a sleep state, the electronic device 100 may process some functions on the basis of the function support without the activation of the application processor 30, so that it may support more efficient information processing and may reduce power consumption according to the management of the application processor 30. Additionally, as providing information according to the management of the CP 20 to the activated application processor 30, the electronic device 100 may provide the continuity of the information.

The electronic device 100 may establish a communication channel with the other electronic device 102 and the server device 104 through the network 162 or may receive data from the other electronic device 102 or the server device 104. The network 162 may include telecommunications network, for example, at least one of computer network (for example, LAN or WAN), internet, and telephone network. The network 162 may support a communication channel establishment relating to communication service management of the electronic device 100. When the application processor 30 is in a sleep state in relation to a communication channel establishment, the electronic device 100 may perform processing on the basis of the management of the CP 20. When the application processor 30 is in a sleep state, the electronic device 100 may process information received through a communication channel on the basis of the CP 20.

The other electronic device (for example, an external electronic device) 102 may be the same or different type of the electronic device 100. The other electronic device 102 may transmit a call connection request message to the electronic device 100 via the network 162 or may establish a communication channel to request message transmission. In relation to a call connection request or message that the other electronic device 102 transmits, when the application processor 30 is in a sleep state, the electronic device 100 may perform processing on the CP 20.

The server device 104 may include a group of one or more servers. According to various embodiments of the present disclosure, all or part of operations executed on the electronic device 100 may be executed on another one or more electronic devices (for example, the other electronic device 102 or the server device 104). The server device 104 may establish a communication channel with the electronic device 100 or the other electronic device 102 in relation to data service support. The server device 104 may transmit a variety of information (for example, advertisements, push messages, text messages, e-mails, and so on) to the electronic device 100 through the established communication channel. When the application processor 30 is in a sleep state, the electronic device 100 may perform processing in relation to the received information processing on the basis of the CP 20.

According to embodiments of the present disclosure, when the electronic device 100 performs a certain function or service automatically or by a request, the electronic device 100 may request at least part of a function relating thereto from another device (for example, the other electronic device 102 or the server device 104) instead of or in addition to executing the function or service by itself. The other electronic devices (for example, the other electronic device 102 or the server device 104) may execute the requested function or an additional function and may deliver an execution result to the electronic device 100. The electronic device 100 may provide the requested function or service by processing the received result as it is or additionally. For this, for example, cloud computing, distributed computing, or client-server computing technology may be used.

The electronic device 100 may include a bus 110, a processor 120, a memory 130, an input/output interface 140, a display 150, a communication interface 160, and a renderer 170.

The bus 110, for example, may include a circuit for connecting the components 120 to 170 to each other and delivering a communication (for example, control message and/or data) between the components 120 to 170. For example, when the application processor 30 is in a sleep state, the bus 110 may deliver information received through the communication interface 160 to the CP 20. The bus 110 may deliver a control signal of the CP 20 to the memory 130 and may deliver information stored in a display memory 131 of the memory 130 to the display 150. According to various embodiments of the present disclosure, when the application processor 30 changes from a sleep state to an activation state, information processed in the CP 20 may be delivered to the application processor 30 while the application processor 30 is in a sleep state.

The processor 120 may include at least one of a first processor such as the Application Processor (AP) 30, a second processor such as the CP 20, and a central processing unit (CPU). The processor 120, for example, may execute calculation or data processing for control and/or communication of at least one another component of the electronic device 100. According to various embodiments of the present disclosure, the processor 120 may support a management of the renderer 170. Information processed by the renderer 170 may be delivered to the display 150. The AP 30 included in the processor 120 may be responsible for signal processing relating to various user functions of the electronic device 100. For example, the AP 30 may support the processing of at least one application 187. The CP 20 may be responsible for information processing relating to a specified function when the AP 30 is in a sleep state. For example, the CP 20 may perform the processing of data, for example, information (for example, calls, text or chatting messages, e-mails, and so on) relating to a communication event when the AP 30 is in a sleep state.

The memory 130 may include volatile and/or nonvolatile memory. The memory 130, for example, may store instructions or data relating to at least one another component of the electronic device 100. The memory 130 may store software and/or program 180. The programs 180, for example, may include a kernel 181, a middleware 183, an application programming interface (API) 183, and/or an application program (or an application) 187. At least part of the kernel 181, the middleware 183, or the API 185 may be called an operating system (OS).

The kernel 181, for example, may control or manage system resources (for example, the bus 110, the processor 120, the memory 130, and so on) used for performing operations or functions implemented in other programs (for example, the middleware 183, the API 185, or the application 187). Additionally, the kernel 181 may provide an interface for controlling or managing system resources by accessing an individual component of the electronic device 100 from the middleware 183, the API 185, or the application 187. According to an embodiment of the present disclosure, when the AP 30 is in a sleep state, the kernel 181 may provide an interface for controlling or managing system resources relating to the management of the CP 20.

The middleware 183, for example, may serve as an intermediary role for exchanging data as the API 185 or the application 187 communicates with the kernel 181. Additionally, in relation to job requests received from the application 187, the middleware 183, for example, may perform a control (for example, scheduling or load balancing) for the job requests by using a method of assigning a priority for using a system resource (for example, the bus 110, the processor 120, the memory 130, and so on) of the electronic device 100 to at least one application program among the application 187. According to an embodiment of the present disclosure, the middleware 183 may deliver a sleep state of the AP 30 to the kernel 181 and may support an API call relating to the management of the CP 20.

The API 185, as an interface for allowing the application 187 to control a function provided from the kernel 181 or the middleware 183, may include at least one interface or function (for example, an instruction) for file control, window control, image processing, or character control. According to an embodiment of the present disclosure, when the AP 30 is in a sleep state, the API 185 may include an API relating to the information processing of the CP 20. For example, the API 185 may include an API defined to transfer a control relating to the information processing of the CP 20, an API defined to output information that the CP 20 receives through at least one of the display 150 and the input/output interface 140 when the AP 30 is in a sleep state, and an API defined to provide information that the CP 20 receives to the AP 30 while the AP 30 is in a sleep state.

According to an embodiment of the present disclosure, the memory 130 may include the display memory 131. The display memory 131, for example, may include a stored background image or at least one selection image according to a control of the AP 30. A default image, for example, may be a background image of an image to be processed by the CP 20 according to a specific communication event reception. At least one selection image may be at least one image to be outputted according to the type of a communication event processed by the CP 20.

The input/output interface 140, for example, may serve as an interface for delivering instructions or data inputted from a user or another external device to another component(s) of the electronic device 100. Additionally, the input/output interface 140 may output instructions or data received from another component(s) of the electronic device 100 to a user or another external device. According to an embodiment of the present disclosure, the input/output interface 140 may generate an event relating to a request for sleep of the AP 30 and a request for activation of the AP 30.

According to various embodiments of the present disclosure, the input/output interface 140 may further include a vibration module 141, an audio processing module 143, an LED processing module 145, and a key input module 147.

The vibration module 141 may perform a vibration output of the electronic device 100. According to an embodiment of the present disclosure, the vibration module 141 may include a vibration control module and a vibration device. The vibration control module may receive a specified vibration pattern from the CP 20 when the AP 30 is in a sleep state. The vibration control module may vibration a vibration device according to the received vibration pattern. According to an embodiment of the present disclosure, when the AP 30 is in an activation state, the vibration control module may receive a vibration pattern from the AP 30 and controls a vibration output according thereto.

The audio processing module 143 may output audio data relating to the management of the electronic device 100. For example, the audio processing module 143 may output audio data relating to a specified user function management in correspondence to a control of the AP 30. According to various embodiments of the present disclosure, when the AP 30 is in a sleep state, in correspondence to a control of the CP 20, the audio processing module 143 may output audio data relating to communication event processing. In relation to this, when the AP 30 is in a sleep state, the audio processing module 143 may store and mange audio data to be outputted according to a control of the CP 20.

The LED processing module 145 may include at least one LED and an LED control module. The LED control module may control LED blinking in correspondence to a control of the AP 30. According to various embodiments of the present disclosure, when the AP 30 is in a sleep state, the LED control module may control LED blinking in correspondence to a control of the CP 20. For example, the LED control module may receive a blinking pattern to be processed according to a communication event reception from the CP 20 and may control LED blinking according to the received blinking pattern information.

The key input module 147 may include at least one key button. The key button may generate an input signal according to an applied pressure. According to an embodiment of the present disclosure, the key input module 147 may generate a signal for switching the AP 30 into a sleep state or switching the AP 30 in a sleep state into an activation state in correspondence to the type of a selected key button. According to various embodiments of the present disclosure, the key input module 147 may allocate at least one key button in relation to the management of the CP 20. Accordingly, when the AP 30 is in a sleep state, the key input module 147 may generate an input signal for processing a communication event that the CP 20 receives. The input signal relating to communication event processing may include at least one of an input signal relating to call reception connection or rejection, an input signal for requesting a specified message transmission, an input signal relating to message writing or transmission, and an input signal relating to check or cancellation of information outputted to the display 150. The generated input signal is delivered to the CP 20 so that it may support function performance according to the type of the input signal.

The display 150, for example, may include a liquid crystal display (LCD), a light emitting diode (LED) display, an organic light emitting diode (OLED) display, a microelectromechanical systems (MEMS) display, or an electronic paper display. The display 150 may display various content (for example, text, image, video, icon, symbol, and so on) to a user. The display 150 may include a touch screen, and for example, may receive a touch, gesture, proximity, or hovering input by using an electronic pen or a user's body part.

According to various embodiments of the present disclosure, when the AP 30 is in an activation state, the display 150 may perform a screen output according to a control of the AP 30. When the AP 30 is in a sleep state, the display 150 may perform a screen output according to a control of the CP 20. According to an embodiment of the present disclosure, the display 150 may perform an output of information stored in the display memory 131. For example, the display 150 may display a background image written before the AP 30 sleeps and an additional image that the CP 20 provides when the AP 30 is in a sleep state. Alternatively, the display 150 may display a specific selection image that the CP 20 selects when the AP 30 is in a sleep state among at least one selection image written before the AP 30 sleeps.

The communication interface 160, for example, may set a communication between the electronic device 100 and an external device (for example, the other electronic device 102 or the server device 104). For example, the communication interface 160 may communicate with an external device (for example, the other electronic device 102 or the server device 104) in connection to the network 162 through wireless communication (or short range wireless communication) or wired communication. The wireless communication may use LTE, LTE-A, CDMA, WCDMA, UMTS, WiBro, or GSM as a cellular communication protocol, for example. The wired communication, for example, may include at least one of universal serial bus (USB), high definition multimedia interface (HDMI), recommended standard 232 (RS-232), and plain old telephone service (POTS). The short range wireless communication may include a communication method based on a Bluetooth communication module, a WiFi direct communication module, and so on.

When the AP 30 is in an activation state, the communication interface 160 may deliver a received communication event to the AP 30 through the CP 20. When the AP 30 is in a sleep state, the communication interface 160 may deliver a received communication event to the CP 20. When the AP 30 is in a sleep state, the communication interface 160 may process signal transmission/reception in correspondence to a control of the CP 20.

The renderer 170 may perform image processing in correspondence to a control of the AP 30 and may deliver it to the display 150. Alternatively, the renderer 170 may deliver the processed image to the display memory 131. According to various embodiments of the present disclosure, when the AP 30 is in a sleep state, the renderer 170 may perform image processing in correspondence to a control of the CP 20. Alternatively, when the AP 30 is in a sleep state, the renderer 170 may have a state of being separated from the CP 20. Correspondingly, the CP 20 may not manage the renderer 170 when the AP 30 is in a sleep state and may process additional image writing on the display memory 131.

Figure 2:
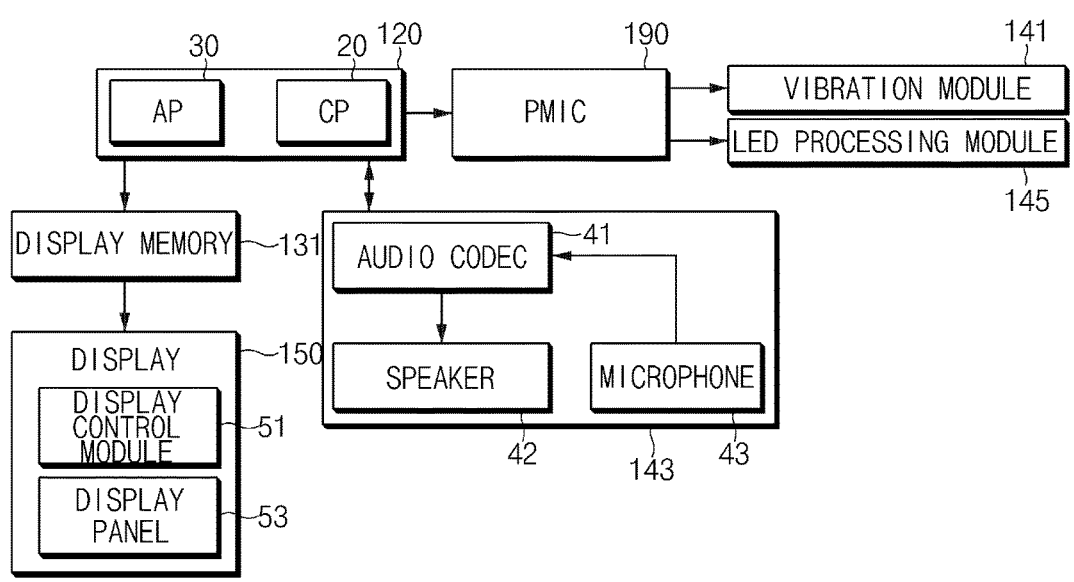
FIG. 2 illustrates a configuration of an electronic device according to various embodiments of the present disclosure.

FIG. 2 illustrates a configuration of an electronic device according to various embodiments of the present disclosure.

Referring to FIG. 2, an electronic device 100 may include a processor 120 (including an AP 30 and a CP 20), a display memory 131, a display 150 (including a display control module 51 and a display panel 53), an audio processing module 143 (including an audio codec 41, a speaker 42, and a microphone 43), and a power management integrated circuit (PMIC) 190 (connected to a vibration module 141 and an LED processing module 145). According to various embodiments of the present disclosure, the vibration module 141 and the LED processing module 145 may be configured with modules separated from the PMIC 190. Correspondingly, the vibration module 141 and the LED processing module 145, for example, are prepared in a form of being included in the input/output interface 140 and may operate according to a control of the PMIC 190 through the bus 110. Additionally, according to various embodiments of the present disclosure, the vibration module 141 and the LED processing module 145 may be prepared in the PMIC 190. Alternatively, according to various embodiments of the present disclosure, a partial configuration of the vibration module 141, for example, a vibration driver, may be included in the PMIC 190 or disposed as an additional separated IC. Then, a vibrator (for example, a motor) in the vibration module 141 may perform vibration in correspondence to a control of a vibration driver. The LED processing module 145 or a partial configuration may be included in the PMIC 190 or prepared in an additional separated configuration. For example, the LED driver may be included in the PMIC 190 or prepared as a separated chip and an LED may be blinked according to a control of the LED driver.

The AP 30 may switch into a sleep state according to scheduled information. For example, if there is no user input signal for a specified time, the AP 30 may switch into a sleep state. Alternatively, when an input signal occurs by a specified key button (for example, a power button), the AP 30 may switch into a sleep state. According to an embodiment of the present disclosure, the AP 30 may support various application executions relating to a user function in an activation state. For example, the AP 30 may support various application executions such as a video play function, a camera function, a broadcast reception function, a document editing function, a gallery function, and a game function. Additionally, the AP 30 may support managements of a call function, a message function, a chatting function, and an e-mail function.

According to various embodiments of the present disclosure, when a sleep state shift is requested (for example, a specified time elapse with no user input, power button selection, and so on), the AP 30 may perform a control to write a specified background image or at least one selection image on the display memory 131. The AP may deliver a control of the display memory 131 and the display 150 or a control of the audio processing module 143, the PMIC 190, the vibration module 141, and the LED processing module 145 to the CP 20. The AP 30 may enter a sleep state after transferring a control.

When the AP 30 is in an activation state, the CP 20 may support information processing according to a request of the AP 30. For example, when receiving a communication event from an application disposed in the AP 30, the CP 20 may perform a control to transmit the communication event to the other electronic device 102 or the server device 104 through a communication interface. The CP 20 may deliver a communication event received from the other electronic device 102 or the server device 104 through a communication interface to a corresponding application through the AP 30.

When the AP 30 shifts into a sleep state, the CP 20 may perform a control of the display memory 131, the display 150, the audio processing module 143, the PMIC 190, the vibration module 141, and the LED processing module 145 by receiving a transferred control. For example, when receiving a communication event, the CP 20 may display at least one of a background image stored in the display memory 131 and a selection image to the display 150. Alternatively, when a communication event is received, the CP 20 may output specified audio data through the audio processing module 143. The CP 20 may perform a call connection in correspondence to an input event reception when the AP 30 is in a sleep state. The CP 20 may perform audio data processing (for example, voice call processing) according to a call connection. The CP 20 may execute a vibration pattern according to a communication event reception through the vibration module 141. The CP 20 may execute a lamp blinking pattern according to a communication event reception through the LED processing module 145. In relation to this operation, the CP 20 may perform a control of power delivered to the vibration module 141 or the LED processing module 145 by controlling the PMIC 190.

When the AP 30 is in an activation state, the display memory 131 may have a state of storing various images outputted to the display 150 in correspondence to a control of the AP 30. For example, the display memory 131 may store an image relating to a home screen or a standby screen to be outputted to the display 150, an image relating to a screen according to a specific user function execution, and so on. Alternatively, the display memory 131 may store a video image to be outputted to the display 150 in correspondence to a control of the AP 30.

According to various embodiments of the present disclosure, when the AP 30 shifts into a sleep state, the display memory 131 may have a state of storing a background image stored by the AP 30 or at least one selection image. When the AP 30 is in a sleep state, the display memory 131 may support an image output in correspondence to a control of the CP 20. The display memory 131 may update a background image stored by the AP through a control of the CP 20 and may deliver the updated image to the display 150. Alternatively, the display memory 131 may deliver a selection image that the CP 20 selects among selection images selected by the AP 30 to the display 150.

The display 150 may display various screens relating to the management of the electronic device 100. During this operation, the display 150 may receive and output an image stored in the display memory 131. For example, when the AP 30 is in an activation state, the display 150 may display an image relating to a home screen or a standby screen stored in the display memory 131 or a specific function execution screen. According to various embodiments of the present disclosure, when the AP 30 is in a sleep state, the display 150 may display an image stored in the display memory 131, for example, a background image or a selection image, in correspondence to a control of the CP 20. The background image may be partially updated according to a control of the CP 20. Accordingly, the display 150 may display an update image in which at least part of the background image is updated. The above-mentioned display 150 may include a display control module 51 for reading an image stored in the display memory 131 and a display panel 53 for outputting the read image. The display control module 51, for example, may be a display driver IC (DDI). The display panel 53 may configure a pixel in which a signal lines are disposed in a matrix and for example, may be a liquid crystal display panel or an organic light emitting display panel.

When receiving a communication event (for example, a call connection request event, a message event, and an e-mail event, which are received from the other electronic device 102 or the server device 104), the audio processing module 143 may output specified audio data (for example, a guide sound notifying a call connection request, a message reception guide sound, and so on). During this operation, when the AP 30 is in an activation state, the audio processing module 143 may output specified audio data in correspondence to a control of the AP 30. When the AP 30 is in a sleep state, the audio processing module 143 may output specified audio data in correspondence to a control of the CP 20.

According to various embodiments of the present disclosure, when the AP 30 is in a sleep state, the audio processing module 143 may output audio data or may process a call sound received through the communication interface 160. For example, the audio codec 41 in the audio processing module 143 may decode specified audio data and output it through the speaker 42. The audio processing module 143 may process encoding or decoding on a received call sound by using the audio codec 41 and output it through the speaker 42. The audio codec 41 may binarize and encode a voice signal received through the microphone 43 and may deliver it to the communication interface 160 in correspondence to a control of the CP 20.

When the AP 30 is in an activation state, the PMIC 190 may provide power to hardware of an electronic device (for example, a camera device, a sensor module, the display 150, the audio processing module 143, the LED processing module 145, the communication interface 160, and so on) in correspondence to a control of the AP 30. According to various embodiments of the present disclosure, when the AP 30 is in a sleep state, the PMIC 190 may supply power to the display 150, the audio processing module 143, the LED processing module 145, and the communication interface 160 in correspondence to a control by the CP 20.

According to various embodiments of the present disclosure, when the AP 30 is in a sleep state, the PMIC 190 may supply the power corresponding to a specified vibration pattern to the vibration module 141 in correspondence to a control by the CP 20. Alternatively, when the AP 30 is in a sleep state, the PMIC 190 may supply the power corresponding to a specified lamp blinking pattern or a specified lamp color to the LED processing module 145 in correspondence to a control by the CP 20.

Figure 3:
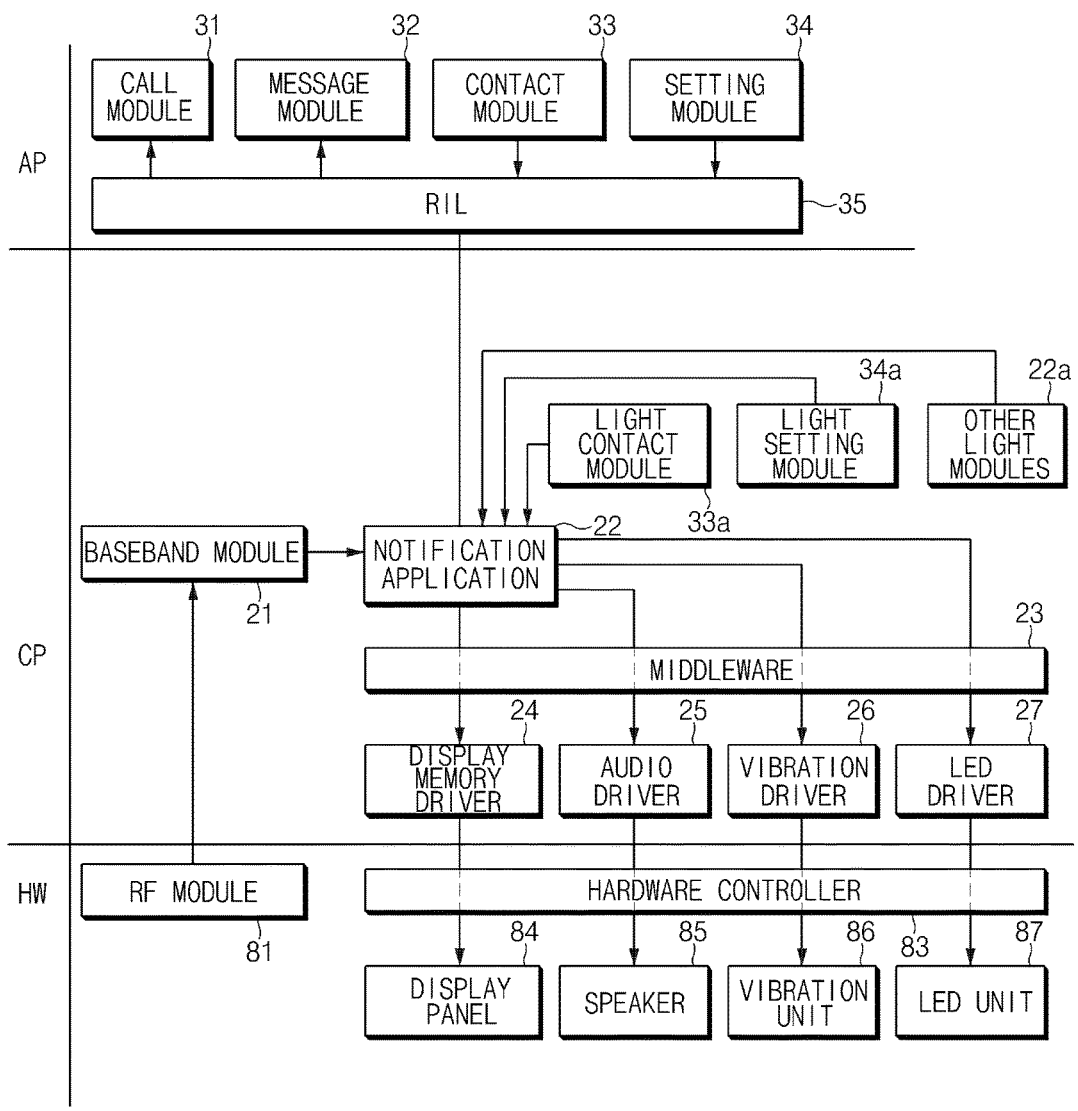
FIG. 3 illustrates an information processing related platform structure according to various embodiments of the present disclosure.

FIG. 3 illustrates an information processing related platform structure according to various embodiments of the present disclosure.

Referring to FIG. 3, the AP 30 may manage at least one application 187 of a call module 31, a message module 32, a contact module 33, and a setting module 34. Additionally, the AP 30 may manage a radio interface layer (RIL) 35.

The call module 31 may be an application relating to the call function support of the electronic device 100. When the AP 30 is in an activation state, the call module 31 may receive a communication event through the RIL 35. The call module 31 may process the received communication event. For example, the call module 31 may perform a notification output according to a communication event reception. The call module 31 may perform a function according to a call connection in correspondence to a user input.

The message module 32 may be an application relating to the message function support of the electronic device 100. When the AP 30 is in an activation state, the message module 32 may receive a message through the RIL 35. The message module 32 may perform a notification output according to a message reception. According to various embodiments of the present disclosure, the message module 32 may support a message writing function and a transmission function.

The contact module 33 may perform a phone book management. For example, when a communication event occurs, the contact module 33 may check information such as a phone number included in a communication event and may perform an output of information mapped into corresponding information. According to various embodiments of the present disclosure, the contact module 33 may support update and search of phone book information.

The setting module 34 may be an application for storing and managing communication function setting information. For example, when receiving a call connection request, the setting module 34 may store and manage an output setting (for example, specified audio data setting, vibration setting, and lamp setting) of notification information. Additionally, the setting module 34 may manage an output setting (for example, message reception notification or mute) for a message reception notification.

The RIL 35 may deliver a communication event that the CP 20 receives to the AP 30. Alternatively, the RIL 35 may deliver a control signal or message according to a management of the AP 30 to the CP 20. According to an embodiment of the present disclosure, the RIL 35 may check the type of a communication event delivered from the notification application 22 disposed in the CP 20 and may deliver information according to a corresponding event to the call module 31 and the message module 32. According to various embodiments of the present disclosure, when a sleep state shift of the AP 30 is requested, the RIL 35 may deliver phone book information that the contact module 33 manages, and setting data that the setting module 34 manages to the notification application 22 of the CP 20 in correspondence to a control by the AP 30. When an activation state of the AP 30 is requested, the RIL 35 receives communication event related processing information from the CP 20 and may deliver the received communication event related processing information to the call module 31 or the message module 32.

The CP 20 may manage a baseband module 21, a notification application 22, a middleware 23 (for example, the middleware 183), a display memory driver 24, an audio driver 25, a vibration driver 26, and an LED driver 27.

The baseband module 21 may control an RF module 81. For example, the baseband module 21 may binarize and decode a signal in analog form that the RF module 81 receives and switch it to a communication event. The baseband module 21 may deliver the switched communication event to the notification application 22.

When the AP 30 is in an activation state, the notification application 22 may deliver a communication event to the RIL 22. When the AP 30 is in a sleep state, the notification application 22 may deliver a communication event that the baseband module 21 provides to a driver through the middleware 23. During this operation, on the basis of phone book information that a light contact module 33a corresponding to the contact module 33 provides and setting data that a light setting module 34a corresponding to the setting module 34 provides, the notification application 22 may deliver a control signal relating to communication event processing to a driver. The light contact module 33a or the light setting module 34a may be a module managed by the CP 20 when the AP 30 is in a sleep state The light contact module 33a or the light setting module 34a may be prepared to include at least part of the contact module 33 and the setting module 34 of the AP 30. After the light contact module 33a or the light setting module 34a is generated right before the AP 30 enters a sleep state, it may be removed in correspondence to an activation of the AP 30 or may be maintained according to a setting. While the AP 30 is in a sleep state, other light modules 22a may be disposed in a CP area in relation to processing by the CP 20. The other light modules 22a, for example, may include sound setting, font setting, and character data relating to a communication function management of the CP 20.

When the AP 30 is activated, the notification application 22 may provide information received and processed when the AP 30 is in a sleep state to the call module 31 and the message module 32 through the RIL 35.

The middleware 23 may receive a notification control signal (for example, a control signal relating to a hardware management to be performed in correspondence to the type of a communication event and setting data) from the notification application 22. The middleware 23 may deliver a notification control signal to at least one of a display memory driver 24, an audio driver 25, a vibration driver 26, and an LED driver 27 which are connected to the middleware 23.

The display memory driver 24 may be a driver relating to a control of the display memory 131. According to an embodiment of the present disclosure, when the AP 30 is in a sleep state, the display memory driver 24 may deliver at least one of a background image and a selection image of the display memory 131 to the display panel 53 through the hardware controller 83 according to a control of the CP 20.

When a specified audio data output is requested from the notification application 22, the audio driver 25 may deliver corresponding audio data to the speaker 42 through the hardware controller 83. Additionally, when the AP 30 is in a sleep state, the audio driver 25 may process a call sound transmitted/received according to a control of the CP 20.

In relation to communication event processing of the notification application 22, the vibration driver 26 may deliver vibration pattern information written in setting data to the vibration unit 86 (for example, the vibration module 141) through the hardware controller 83. In relation to communication event processing of the notification application 22, the LED driver 27 may deliver a lamp blinking pattern or lamp color information written in setting data to the LED unit 87 (for example, the LED processing module 147) through the hardware controller 83.

Hardware may include an RF module 81, a hardware controller 83, a display panel 53, a speaker 42, a vibration unit 86, and an LED unit 87. The RF module 81 may include an antenna relating to data transmission/reception and an antenna control module for delivering information that the antenna receives to the baseband module 21 or processing an output of a signal that the baseband module 21 delivers. According to an embodiment of the present disclosure, when receiving an analog signal corresponding to a communication event (for example, call connection request, message, and so on), the RF module 81 may deliver the analog signal to the baseband module 21. The hardware controller 83 may control power supply and information output of hardware devices, for example, the display panel 53, the speaker 42, the vibration unit 86, and the LED unit 87.

According to an embodiment of the present disclosure, the hardware controller 83 may be a display driver IC relating to the management of the display panel 53. Alternatively, the hardware controller 83 may be the renderer 170. Alternatively, the hardware controller 83 may be an audio codec connected to the speaker 42. When the AP 30 is in a sleep state, the display panel 53 may display at least one of a background image and a selection image in correspondence to a control of the CP 20. The speaker 42 may output specified audio data corresponding to a received communication event notification. The vibration unit 86 may execute a vibration pattern corresponding to a communication event notification. The LED unit 87 may perform a lamp management of lamp blinking or specific color corresponding to a communication event notification.

Figure 4A:
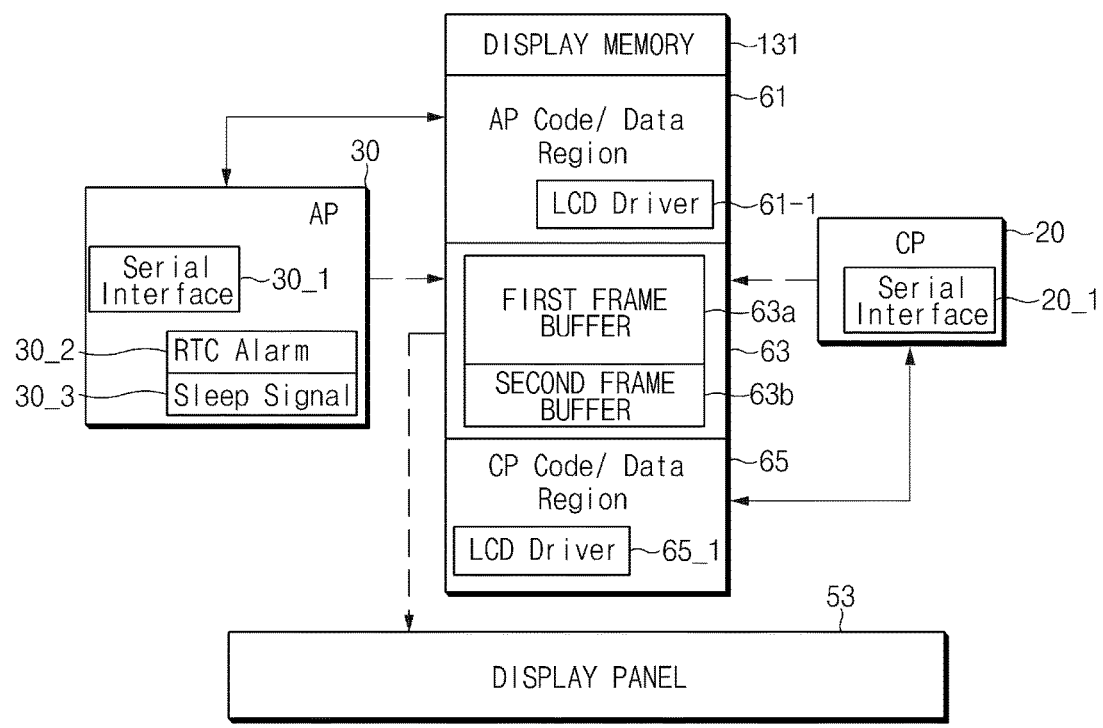
FIG. 4A illustrates a memory management according to various embodiments of the present disclosure'

FIG. 4A illustrates a memory management according to various embodiments of the present disclosure.

Referring to FIG. 4A, a block relating to memory management, for example, may include the AP 30, the display memory 131, and the CP 20. The display panel 53 may perform an output of data stored in the display memory 131. The display memory 131, for example, may include a frame buffer area (or a common area) 63.

When the sleep of the AP 30 is requested, the frame buffer area 63 may include a first frame buffer 63a where a background or at least one selection image is written in correspondence to a control of the AP 30. When the AP 30 is in a sleep state, the frame buffer area 63 may include a second frame buffer 63b where an additional image is written in correspondence to a control of the CP 20. According to various embodiments of the present disclosure, the second frame buffer 63b may be a dedicated area of the CP 20. In relation to this, the electronic device 100 may have an additional memory including the second frame buffer 63b that the CP 20 exclusively accesses.

The AP 30 may deliver data written in the frame buffer area 63 to the display panel 53 on the basis of an interface 30_1 (for example, a serial interface) connected to the display panel 53. The AP 30 may include a real time clock (RTC) alarm. The AP 30 may shift into a sleep state in correspondence to a time defined in the RTC alarm 30_2. According to an embodiment of the present disclosure, the AP 30 may write a background image or at least one selection image in the first frame buffer 63a on the basis of a time defined in the RTC alarm 30_2. According to an embodiment of the present disclosure, the AP 30 may generate a sleep signal 30_3 on the basis of a time defined in the RTC alarm 30_2 and may deliver the generated sleep signal 30_3 to the CP 20. When receiving a wakeup signal from the CP 20, the AP 30 may be activated. Once the AP 30 is activated, it may shift into a sleep state again in correspondence to a time defined in the RTC alarm 30_2 and an input event occurrence.

The CP 20 may deliver data written in the frame buffer area 63 to the display panel 53 on the basis of an interface 20_1 (for example, a serial interface) connected to the display panel 53. According to an embodiment of the present disclosure, the CP 20 may deliver data included in the frame buffer area 63 to the display panel 53. For example, the CP 20 may deliver data stored in the first frame buffer 63a of the frame buffer area 63 and data stored in the second frame buffer 63b of the frame buffer area 63 to the display panel 53. According to various embodiments of the present disclosure, the CP 20 may generate an additional image and may write the generated additional image in the second frame buffer 63b. The CP 20 may simultaneously output to the display panel 53 data of the first frame buffer 63a and data of the second frame buffer 63b in the frame buffer area 63.

Figure 4B:
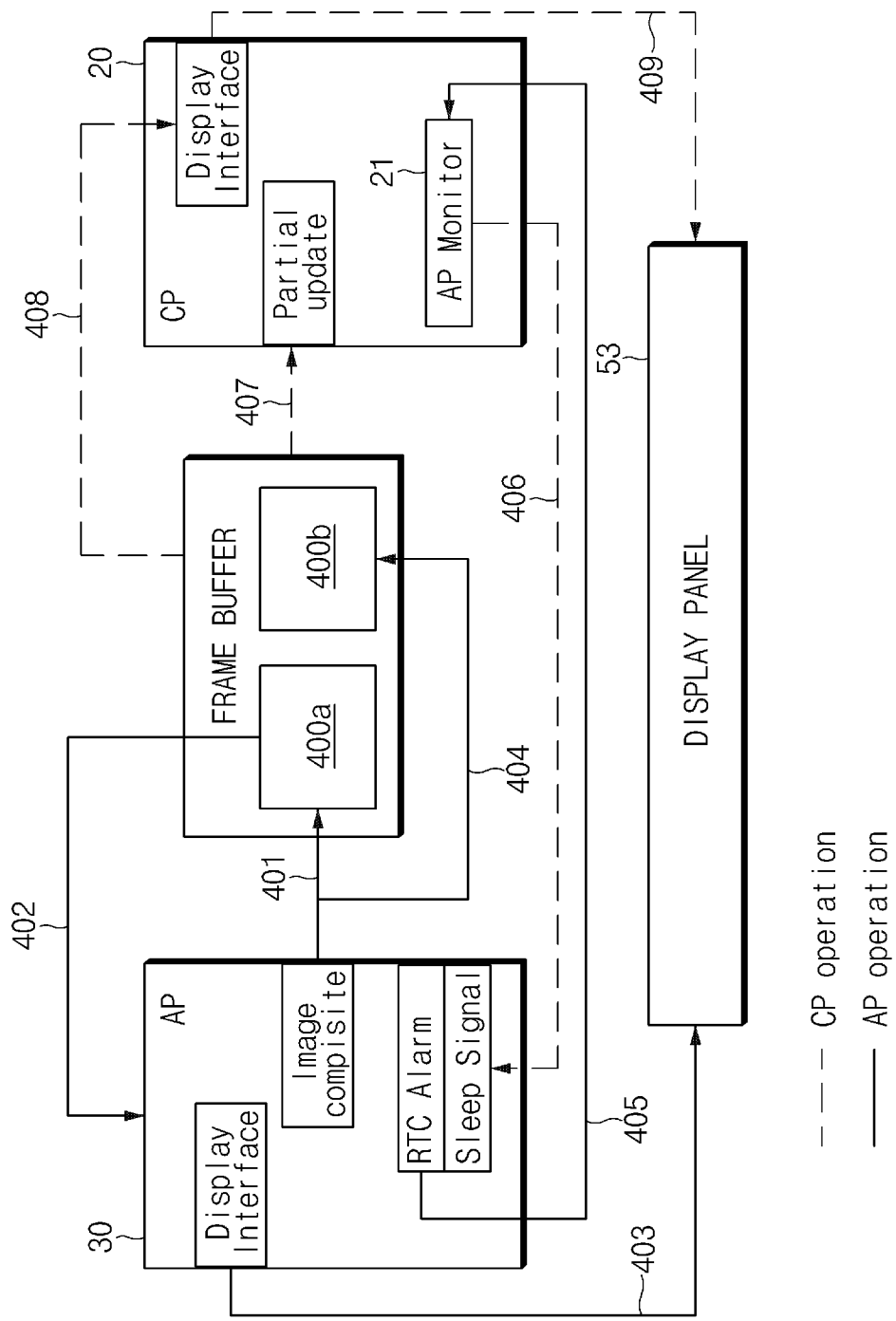
FIG. 4B illustrates a memory management according to various embodiments of the present disclosure.

FIG. 4B illustrates a memory management according to various embodiments of the present disclosure.

Referring to FIG. 4B, the AP 30 may generate a user interface (UI) corresponding to a user input and store it in a frame buffer 400a in operation 401. The AP 30 may update an image stored in the frame buffer 400a in the display panel 53 through operation 402 and operation 403. For example, the AP 30 may read an image stored in the frame buffer 400a in operation 402 and may display the read image to the display panel 53 in operation 403.

According to various embodiments of the present disclosure, the AP 30 may composite image sets of an application relating to a function that the CP 20 itself operates in operation 404 and store it in the frame buffer 400b. The AP 30 may deliver the next wakeup information to an AP monitor 21 of the CP 20 in operation 405 before entering a sleep mode.

The AP monitor 21 of the CP 20 checks whether the AP 30 is in a sleep state in operation 406 and checks the next wakeup information received in operation 405. When the AP 30 is in a sleep mode and a function that the CP 20 itself processes occurs, text based data is partially synthesized in the frame buffer 400b mentioned in operation 404 on the basis of an image set stored through operation 404.

The frame buffer 400b completed through the text based data synthesis is updated to the display panel 53 through operation 408 and operation 409. When the next wakeup information is less than a specific time (for example, 5 sec) or it is not the self processing function mentioned in operation 404, the CP 20 wakes up the AP 30, delivers an event of a corresponding function to the AP 30, and then branches into operation 401 to perform subsequent operations. According to various embodiments of the present disclosure, when the AP 30 is in an active state, the CP 20 may perform operations before operation 401.

Figure 4C:
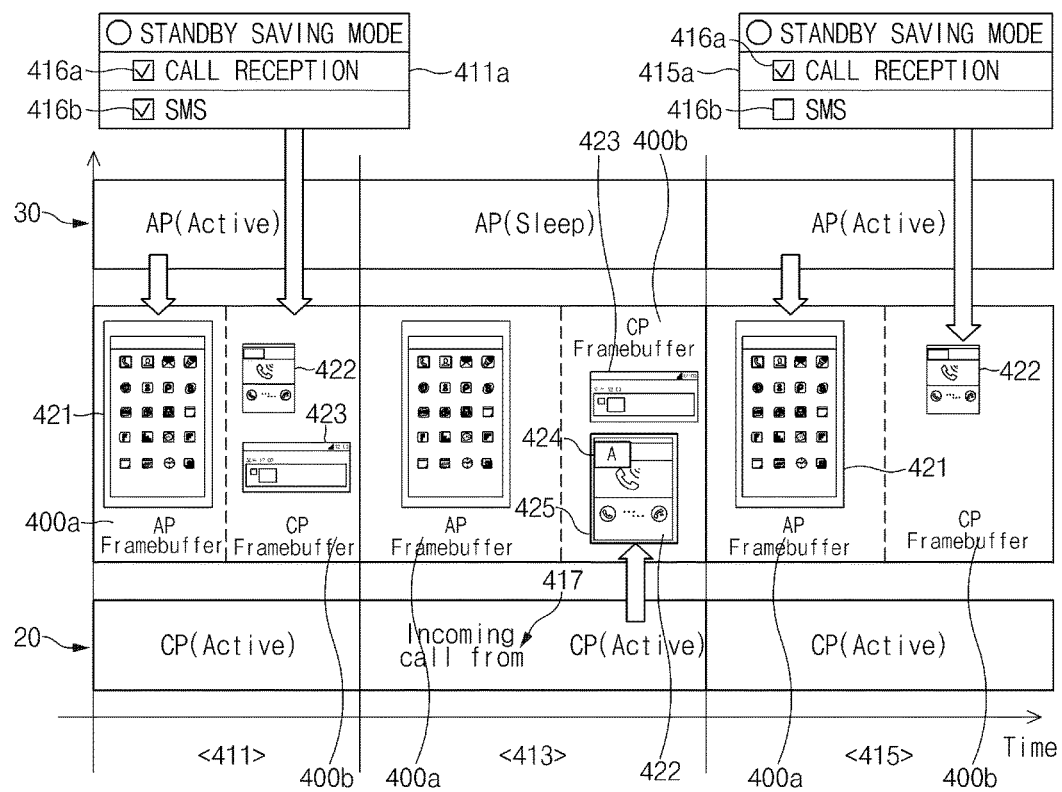
FIG. 4C illustrates a communication processor setting according to various embodiments of the present disclosure.

FIG. 4C illustrates a CP setting according to various embodiments of the present disclosure.

Referring to FIG. 4C, in the electronic device 100, as shown in a state 411, the AP 30 may have an activation state and the CP 20 may have an activation state. When the AP 30 is in an activation state, the CP 20 may have an activation state. In relation to the self operating function, the CP 20 may provide an additional setting menu 411a that the AP 30 uses in a sleep mode situation. The setting menu 411a, for example, may be provided as a standby saving mode item and may include event items self-processed by the CP 20 when the AP 30 is in a sleep state. The setting menu 411a may be a menu set to self-process a call reception event and an SMS reception event by the CP 20.

The AP 30 may composite image sets 422 and 423 of applications based on the CP 20 through a value 416a-416b set in the setting menu 411a. The AP 30 may store the previously composite image sets 422 and 423 in a prepared frame buffer (for example, a frame buffer 400b) and may deliver a setting value to the CP 20. According to various embodiments of the present disclosure, when the AP 30 is in an activation state, the AP 30 may store the image set 421 to be provided according to an application execution in a frame buffer 400a.

As shown in a state 413, the electronic device 100 may have the AP 30 in a sleep state and the CP 20 in an activation state. When an event relating to the CP 20 occurs in a sleep state of the AP 30, the CP 20 may check whether a corresponding event is included in a setting value 416a-416b that the AP 30 delivers. When the event is included in the setting value 416*a*-416*b*, the CP 20 may partially update information on a text that the CP 20 is able to process alone in an image set previously stored in the frame buffer 400*b* relating to the CP 20 corresponding to a setting. For example, when a call reception occurs 417, the CP 20 may generate an output image 425 to be outputted by updating partial update information 424 on the image set 422 in the frame buffer 400*b*. When an occurring event is not included in the setting value, the CP 20 may wake up the AP 30, deliver the event to the AP 30, and support the AP 30 to process the event. According to various embodiments of the present disclosure, as shown in a state 415, the electronic device 100 may have the AP 30 in an activation state and the CP 20 in an activation state. In this case, the electronic device 100 may provide a standby setting mode relating to a self processing function relating to the CP 20. When a call reception function is selected according to a user input, the electronic device 100 may have a state of the setting menu 415*a*. Accordingly, the AP 30 may generate an image set 422 relating to a call reception in the frame buffer 400*b* relating to the CP 20.

Figure 5:
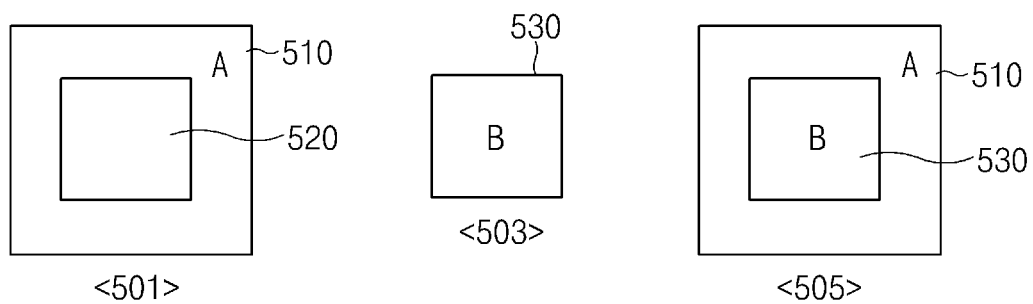
FIG. 5 is a view relating to a partial image data management according to various embodiments of the present disclosure.

FIG. 5 is a view relating to a partial image data management according to various embodiments of the present disclosure.

Referring to FIG. 5, as shown in a state 501, the AP 30 may control a background image generation. The AP 30 may store the generated back image 510 in the display memory 131. According to an embodiment of the present disclosure, when sleep state shift is requested (for example, a specified time of an RTC alarm arrives), the AP 30 may write a specified background image 510 in the first frame buffer 63*a*. An additional area 520 where the additional image 530 shown in a state 503 is disposed may be provided at one side of the background image 510.

As shown in the state 503, when the AP 30 is in a sleep state, the CP 20 may generate the additional image 530 according to a communication event reception. The additional image 530, for example, may vary according to the type of a communication event. According to an embodiment of the present disclosure, when a communication event corresponding to a call connection request is received, the CP 20 may generate an additional image 530 for notifying the call connection request. According to an embodiment of the present disclosure, the CP 20 may include phone book information corresponding to a phone number requested for call connection in the additional image 530. According to various embodiments of the present disclosure, the CP 20 may generate an additional image 530 for notifying message reception. During this operation, the processor 120 may include information on the other electronic device transmitting a message on the basis of phone book information in the additional image 530.

The CP 20 may combine the background image 510 and the additional image 530 as shown in a state 505. In relation to this, the CP 20 may check position information (or memory address information) on the additional area 520 of the background image 510 and may dispose the additional image 530 in the additional area 520. In relation to the above-mentioned function support, the CP 20 may manage information of the background image 510 (for example, position information of the background image 510 and the additional area 520 on the display memory 131 or address information). The CP 20 may deliver the background image 510 where the additional image 530 is disposed to the display memory 131 and may display a stored image to the display panel 53.

As mentioned above, the CP 20 may display to the display panel 53 the background image 510 written before the AP 30 shifts into a sleep state and the additional image corresponding to a currently received communication event type. Accordingly, the CP 20 may reduce calculation load relating to image generation and processing according to a management of the background image 510 prepared by the AP 30.

Figure 6:
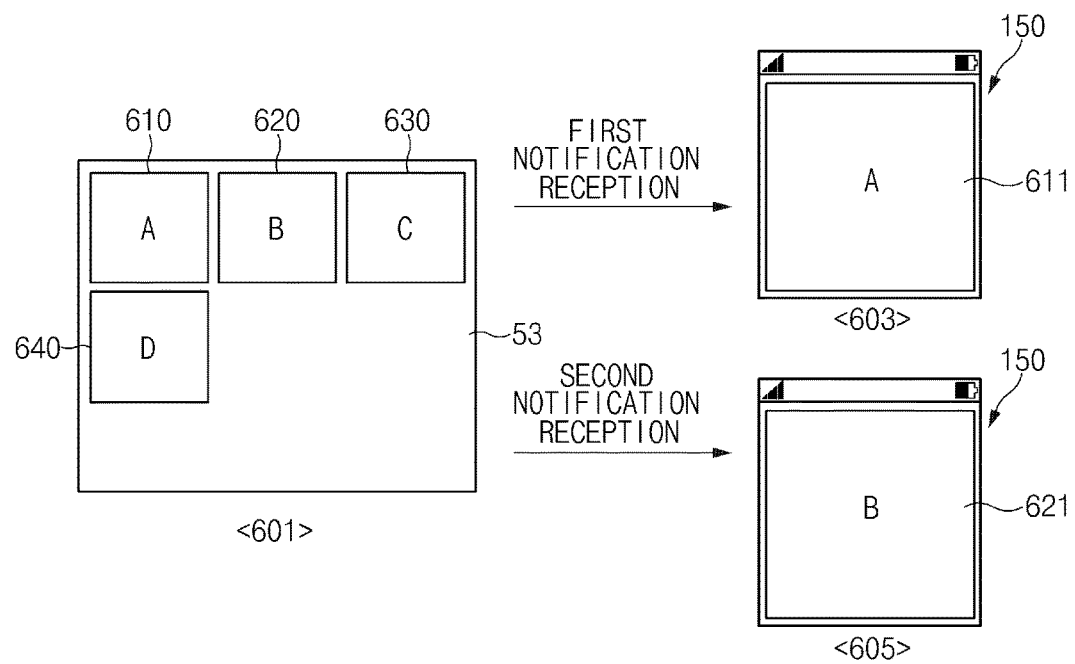
FIG. 6 is a view relating to an image data selection management according to various embodiments of the present disclosure.

FIG. 6 is a view relating to an image data selection management according to various embodiments of the present disclosure.

Referring to FIG. 6, as shown in a state 601, the AP 30 may control of the generations of a plurality of selection images 610, 620, 630, and 640. The AP 30 may store the selection images 610, 620, 630, and 640 in the display memory 131. For example, when a sleep state shift is requested, the AP 30 may write at least one specified selection image (for example, the selection images 610, 620, 630, and 640) in the first frame buffer 63*a*. According to an embodiment of the present disclosure, the selection images 610, 620, 630, and 640 may vary according to the type of a communication event.

The CP 20 may control an output of a specific selection image in correspondence to an occurring communication event. For example, as shown in a state 603, the CP 20 may display a selection screen 611 corresponding to the selection image 610 to the display 150 in correspondence to the type of a communication event. The communication event, for example, may be a call connection request. The selection screen 611 may be an image relating to a call connection request. According to various embodiments of the present disclosure, the selection screen 611 may include a call connection virtual key button, a call rejection virtual key button, and so on. When the call connection virtual key button is selected, the CP 20 may establish a communication channel relating to a call connection with another electronic device when the AP 30 is in a sleep state. When the call rejection virtual key button is selected, the CP 20 may perform processing to reject a received communication event. According to various embodiments of the present disclosure, the CP 20 may process a call rejection and a specified response message automatic transmission when the AP 30 is in a sleep state.

According to various embodiments of the present disclosure, when rejecting the call connection virtual key button, the CP 20 may display a selection screen corresponding to the specified selection image 630. According to an embodiment of the present disclosure, the selection image 630 may be an image relating to a busy call. A selection screen corresponding to the selection image 630, for example, may include a call termination virtual key button. When the call termination virtual key button is selected, the CP 20 may process a call termination.

According to various embodiments of the present disclosure, as shown in a state 605, the CP 20 may display to the display 150 the selection screen 621 corresponding to the selection image 620 in correspondence to a communication event type. For example, when a message reception event occurs, the CP 20 may display the selection screen 621 to the display 150. The selection screen 621, for example, may include a message check virtual key button, a message check cancel virtual key button, and so on. When the message check cancel virtual key button is selected, the CP 20 may remove the outputted selection screen 621 from the display panel 53.

When the message check virtual key button is selected, the CP 20 may remove the outputted selection screen 30 from the display panel 53. In relation to this, the CP 20 may display a selection screen corresponding to the selection image 640. A selection screen corresponding to the selection image 640, for example, may be a background image relating to a message content screen. The CP 20 may check message content and write it on the background image. The CP 20 may display to the display panel 53 a selection screen corresponding to the selection image 640 where message content is written. A selection screen corresponding to the selection image 640, for example, may include a message check termination virtual key button. When the message check termination virtual key button is selected, the CP 20 may remove a selection corresponding to the selection screen 640 from the display panel 53. The above-mentioned background image or selection image, for example, may include text or may be replaced with text.

Figure 7:
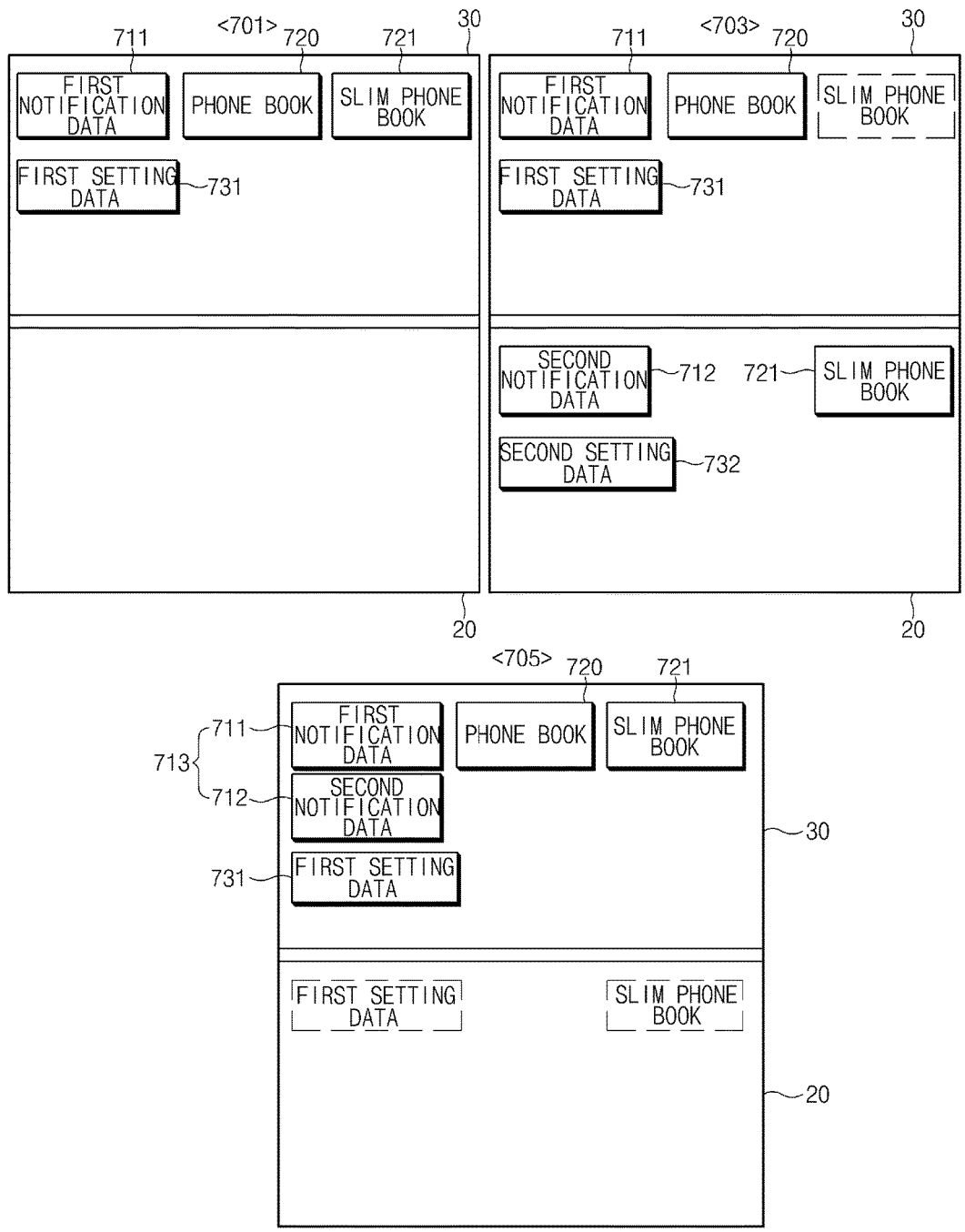
FIG. 7 illustrates a process management according to various embodiments of the present disclosure.

FIG. 7 illustrates a process management according to various embodiments of the present disclosure.

Referring to FIG. 7, as shown in a state 701, the AP 30 may include first notification data 711, a phone book 720, a slim phone book 721, and first setting data 731. The first notification data 711, for example, may be data relating to a communication event when the AP 30 is in an activation state. For example, the first notification data 711 may include call log information, message log information, message content information, and so on. The phone book 720 may include information on a user of another electronic device. For example, the phone book 720 may include another electronic device's phone number, a user name of another electronic device, e-mail address information of another electronic device, a thumbnail relating to a user of another electronic device, address information relating to a user of another electronic device, and memory information relating to another electronic device.

The slim phone book 721 may include at least part of information stored in the phone book 720. For example, the slim phone book 721 may include the phone number of another electronic device and the user name information of another electronic device. The slim phone book 721 may be updated in correspondence to a control of the AP 30 during updating of the phone book 720. The slim phone book 721, for example, if generated by the AP 30, may be stored and managed in a memory area that the CP 20 manages. When an event such as phone book update occurs, the AP 30 may synchronize the slim phone book 721 stored in a memory relating to the CP 20 by synchronizing with the CP 20. A synchronization timing may be a timing at which the slim phone book 721 is updated or a timing at which a sleep entry request of the AP 30 occurs.

The first setting data 731 may include a setting relating to a notification information output when receiving a communication event of the electronic device 100. For example, the first setting data 731 may include the type (for example, at least one of a specified audio data output, a specified vibration output, and a specified lamp blinking) of notification information to be outputted when a call connection request is received. According to an embodiment of the present disclosure, the first setting data 731 may include a setting for outputting specified audio data after outputting a specified vibration during a specified time when a call connection request is received. According to an embodiment of the present disclosure, the first setting data 731 may include a setting for simultaneously outputting specified audio data and a specified vibration when a call connection request is received. According to various embodiments of the present disclosure, the first setting data 731, for example, may include the type of notification information to be outputted when a message is received. For example, the first setting data 731 may include a setting for outputting specified audio data when a message is received. The first setting data 731 may include a setting for outputting a specified vibration pattern when a message is received. The first setting data 731 may be changed in correspondence to a user input when the AP 30 is in an activation state. The first setting data 731 may be generated or updated when a setting is generated or changed by a user input. The first setting data 731, for example, may be synchronized with the second setting data 732 stored in relation to the CP at the generation timing or the change timing. Alternatively, after changed, the first setting data 731 may be synchronized with the second setting data 732 of the CP 20 at the timing that a sleep entry is requested.

As shown in a state 703, when a sleep state shift is requested, the AP 30 may provide the slim phone book 721 and the first setting data 731 to the CP 20. Accordingly, the AP 30 may include the first notification data 711, the phone book 720, and the first setting data 731. According to various embodiments of the present disclosure, when a sleep state is requested, the AP 30 may provide the slim phone book 721 and the second setting data 732 to the CP 20. The second setting data 732 may include a notification setting (for example, the type of a notification and forms such as the size or length of an output) to be outputted according to a communication event reception when the AP 30 is in a sleep state. A user may change the second setting data 732 through a notification setting screen during the activation of the AP 30. According to various embodiments of the present disclosure, when entering a sleep state, the AP 30 may maintain the slim phone book 721. According to various embodiments of the present disclosure, the notification setting screen may be provided by the CP 20 when the AP 30 is in a sleep state.

The CP 20 may include second notification data 712, a slim phone book 721, and second setting data 732 in correspondence to a state in which the CP 20 sleeps. The second notification data 712 may be generated in correspondence to a communication event received when the AP 30 is in a sleep state. For example, the second notification data 712 may include at least one of call log information, message log information, and message content information, which are received when the AP 30 is in a sleep state. The second notification data 712 may be delivered to the AP 30 through a synchronization process when the AP 30 changes from a sleep state to an activation state.

The second notification data 712 may be at least part of the first setting data 731 of the AP 30 or may include a notification setting generated in correspondence to a user setting. According to an embodiment of the present disclosure, the second setting data 732 may include the same notification setting as the first setting data 731. Alternatively, the second setting data 732 may include a different notification setting than the first setting data 731.

When a communication event is received in the sleep state of the AP 30, the CP 20 may composite an additional image by referring to information stored in the slim phone book 721. For example, the CP 20 may check the phone number of another electronic device corresponding to the received communication event and may extract the user name corresponding to the phone number of the other electronic device from the slim phone book 721. The CP 20 may include the extracted user name in an additional image relating to a call notification or a message reception notification and then, output it.

As shown in a state 705, the CP 20 may perform the activation processing of the AP 30 in correspondence to an activation request of the AP 30 (for example, a user input occurrence relating to an activation request of a power button or a home button selection). During this operation, the CP 20 may return to the AP 30 a control (for example, a control of the display 150, a control of the audio processing module 143, a control of the vibration module 141 or the LED processing module 145, and so on). The CP 20 may provide the received communication event related information to the AP 30 when the AP 30 is in a sleep state. For example, the CP 20 may provide the second notification data 712 generated when the AP 30 is in a sleep state to the AP 30.

In correspondence to a change from a sleep state into an activation state, the AP 30 may receive the first notification data 711 from the CP 20 and may store and manage integration notification data 713 obtained by integrating the received first notification data 711 and the second notification data 712. When the AP 30 becomes an activation state, it may generate the slim phone book 721 on the basis of the phone book 720. The AP 30 may include the first setting data 731. According to various embodiments of the present disclosure, when the AP 30 is activated, it may access a memory area of the second notification data 712 that the CP 20 stores to obtain corresponding information.

The CP 20 may store and manage the slim phone book 721 and the second setting data 732 in a CP area. When the AP 30 enters a sleep state, the CP 20 may synchronize the slim phone book 721 or the second setting data 732 relating to the AP 30. Alternatively, when the slim phone book 721 or the second setting data 732 is updated, the CP 20 may perform synchronization. According to various embodiments of the present disclosure, when the CP 20 may remove the stored second notification data 712, the slim phone book 721, and the second setting data 732. When a sleep switch request occurs, if there is an update of the slim phone book 721, the AP 30 may deliver the new slim phone book 721 to the CP 20 or deliver only updated information to the CP 20. Additionally, when new second setting data is generated, the AP 30 may deliver it to the CP 20 when entering a sleep state. If there is no change in the second setting data 732, the AP 30 may notify that there is no information change or may omit an additional information transmission.

As mentioned above, according to various embodiments of the present disclosure, an electronic device may include a communication interface for receiving data (for example, a communication event) when a first processor (for example, an application processor) is in a sleep state and a second processor (for example, a CP) for performing a control to output information to be outputted according to the received communication event through at least one display when the application processor is in a sleep state.

According to various embodiments of the present disclosure, the CP may be set to output a background image provided before the application processor enters a sleep state and an additional image generated according to the communication event type as the output information.

According to various embodiments of the present disclosure, the CP may be set to output an image obtained by disposing the additional image in an additional area disposed in the background image or output information obtained by overlaying the additional image on the background image.

According to various embodiments of the present disclosure, the CP may be set to generate an additional image according to the communication event reception on the basis of phone book information provided before the application processor enters a sleep state.

According to various embodiments of the present disclosure, the CP may be set to output as the output information a selection image corresponding to the communication event type among at least one selection image provided before the application processor enters a sleep state.

According to various embodiments of the present disclosure, the CP may process a notification setting including at least one the type and output form of the communication event notification on the basis of setting data provided before the application processor enters a sleep state.

According to various embodiments of the present disclosure, the CP or the application processor may provide the setting data setting screen relating to the notification setting performed when the application processor is in a sleep state.

According to various embodiments of the present disclosure, the CP may be set to store notification data according to a communication event received when the application processor is in a sleep state.

According to various embodiments of the present disclosure, the CP may be set to share the stored notification data with the application processor when the application processor is activated.

According to various embodiments of the present disclosure, the CP may be set to output specified audio data corresponding to the communication event type through an audio data processing module, output a vibration corresponding to a vibration pattern specified in correspondence to the communication event type, or output at least one of a lamp pattern and color specified in correspondence to the communication event type.

As mentioned above, according to various embodiments of the present disclosure, an electronic device may include a communication interface for receiving a communication event when an application processor is in a sleep state and a CP for storing notification data according to the received communication event in a specified memory area.

According to various embodiments of the present disclosure, the CP may be set to share the stored notification data with the application processor when the application processor is activated. According to various embodiments of the present disclosure, the CP may provide the notification data to the application processor when the application processor is activated.

According to an embodiment of the present disclosure, when the application processor is activated, it may obtain the notification data from a memory area where the notification data is stored.

According to various embodiments of the present disclosure, the CP may update notification data stored based on notification data that the CP provides.

According to various embodiments of the present disclosure, when a sleep switch is requested, the application processor may store a background image relating to the notification data output or at least one selection image in a frame buffer area of a memory that the CP is able to access.

According to various embodiments of the present disclosure, when a sleep switch is requested, the application processor may store a slim phone book generated based on at least partial information of phone book information in a frame buffer area of a memory that the CP is able to access.

According to various embodiments of the present disclosure, the CP may be set to generate an additional image relating to the communication event on the basis of the slim phone book and output the background image and the additional image to a display.

According to various embodiments of the present disclosure, the application processor in an activation state may perform screen processing of a display on the basis of a media acceleration device. When the application processor is in a sleep state, the CP may perform screen processing of the display without the media acceleration device.

As mentioned above, according to various embodiments of the present disclosure, an electronic device may include a CP for processing at least part of a specified function among user functions that the application processor provides and the application processor for delivering a control of hardware relating to the at least part of the specified function to the CP.

The application processor may be set to deliver a control relating to a hardware control of at least one of a display, a vibration module, an LED processing module, and an audio processing module.

The CP may return the control to the application processor when the application processor is activated.

Figure 8:
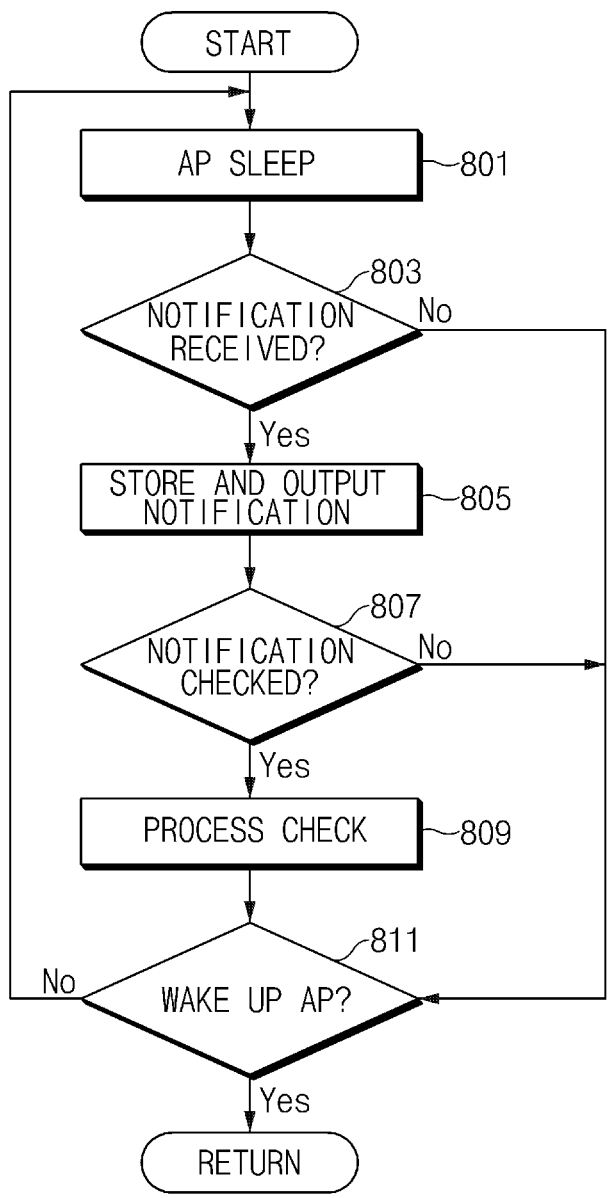
FIG. 8 illustrates a notification information processing method according to various embodiments of the present disclosure.

FIG. 8 illustrates a notification information processing method according to various embodiments of the present disclosure.

Referring to FIG. 8, in relation to the notification information processing method, the AP 30 of the electronic device 100 may be in a sleep state in operation 801. For example, the when an event (for example, a user input or there is no user input for a specified time) relating to a sleep state switch occurs, the AP 30 may perform the sleep state switch. During this operation, the AP 30 may deliver a control of at least part of hardware (for example, the display 150, the audio processing module 143, the vibration module 141, the LED processing module 145, and so on) to the CP 20. The CP 20 may be in an activation state.

In operation 803, the CP 20 of the electronic device 100 may check whether there is a notification reception. For example, the CP 20 may check whether a call connection request is received from another electronic device or whether there is a message reception.

When a notification reception occurs, the CP 20 may perform notification storage and output in operation 805. For example, the CP 20 may generate an additional image in correspondence to a received communication event type and may add the additional image to a background image provided before the AP 30 enters a sleep state. The CP 20 may display the background image and the additional image to the display 150. Alternatively, the CP 20 may display a selection image corresponding to the received communication event type to the display 150. The CP 20 may display a virtual key button (for example, a call connection key button, a call rejection virtual key button, a message check virtual key button, a message check cancel virtual key button, and so on) relating to notification check in a screen outputted to the display 150.

The CP 20 may store notification data (for example, call log information, message log information, message content information, and so on) in correspondence to a call event reception. According to various embodiments of the present disclosure, the CP 20 may store call recording information during a call connection as notification data.

In operation 807, the CP 20 may check whether an event relating to notification check occurs. When an event relating to a notification check (for example, a call connection key button, a call rejection virtual key button, a message check virtual key button, a message check cancel virtual key button, and so on) relating to notification check occurs, the CP 20 may perform check processing in operation 809. For example, the CP 20 may establish a communication channel relating to a call connection. The CP 20 may display message content.

In operation 811, it is checked whether an event (for example, power button selection, home button selection, and so on) relating to the wakeup of the AP 30 occurs. If there is no wakeup event, the electronic device 100 may branch into operation 801 and may support a state maintenance of processors and a processor management.

Figure 9:
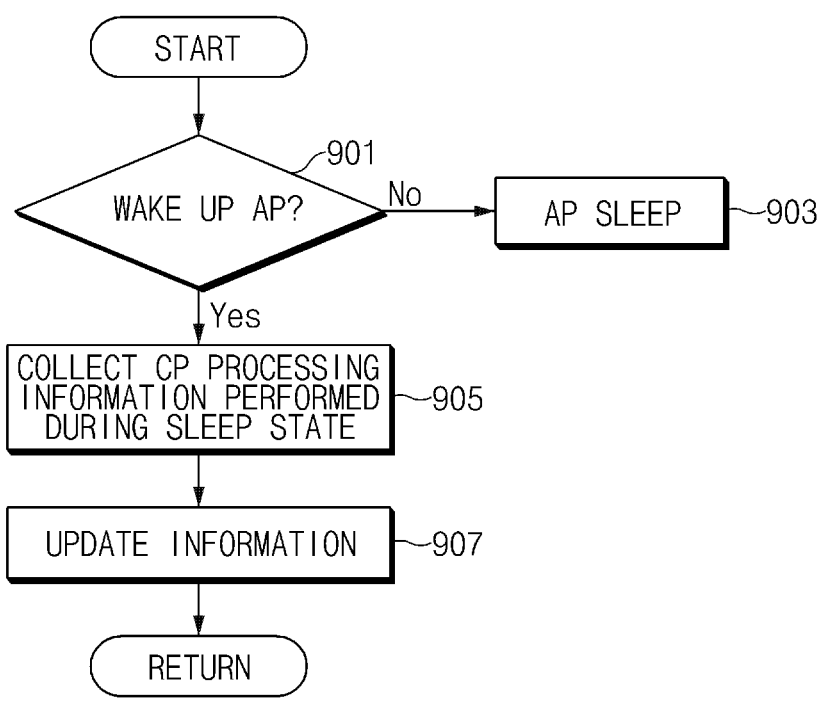
FIG. 9 illustrates an information processing method relating to information update according to various embodiments of the present disclosure.

FIG. 9 illustrates an information processing method relating to information update according to various embodiments of the present disclosure.

Referring to FIG. 9, in relation to the information processing method, the CP 20 may maintain a sleep state of the AP 30 and perform communication event processing. In operation 901, the electronic device 100 may check whether there is an event relating to the wakeup of the AP 30. If there is no event relating to the wakeup of the AP 30, the electronic device 100 may maintain a sleep state of the AP 30 in operation 903. In relation to this, the electronic device 100, as described with reference to FIG. 8, may process a management of a function (for example, a communication function) specified based on the CP 20. When an event for waking up the AP 30 occurs, the AP 30 may perform processing relating to the activation of the AP 30.

In operation 905, the activated AP 30, for example, may collect processing information of the CP 20 performed during a sleep state. For example, the CP 20 may collect call log information, message log information, and message content information according to a communication event occurrence. In relation to this operation, the CP 20 may provide information (for example, notification data) collected in correspondence to the activation of the AP 30 to the AP 30. Alternatively, the AP 30 may access a memory where the CP 20 stores notification data to obtain notification data. Alternatively, when the CP 20 provides address information for storing notification data to the AP 30, the AP 30 may obtain notification data that the CP 20 processes on the basis of corresponding address information. Alternatively, the AP 30 may obtain notification data by referring to a memory are specified in relation to notification data writing.

In operation 907, the AP 30 may perform information update. For example, stored notification data may be updated based on notification data obtained from the CP 20. The AP 30 may return to operation for performing a function support according to a user input after information update.

Figure 10:
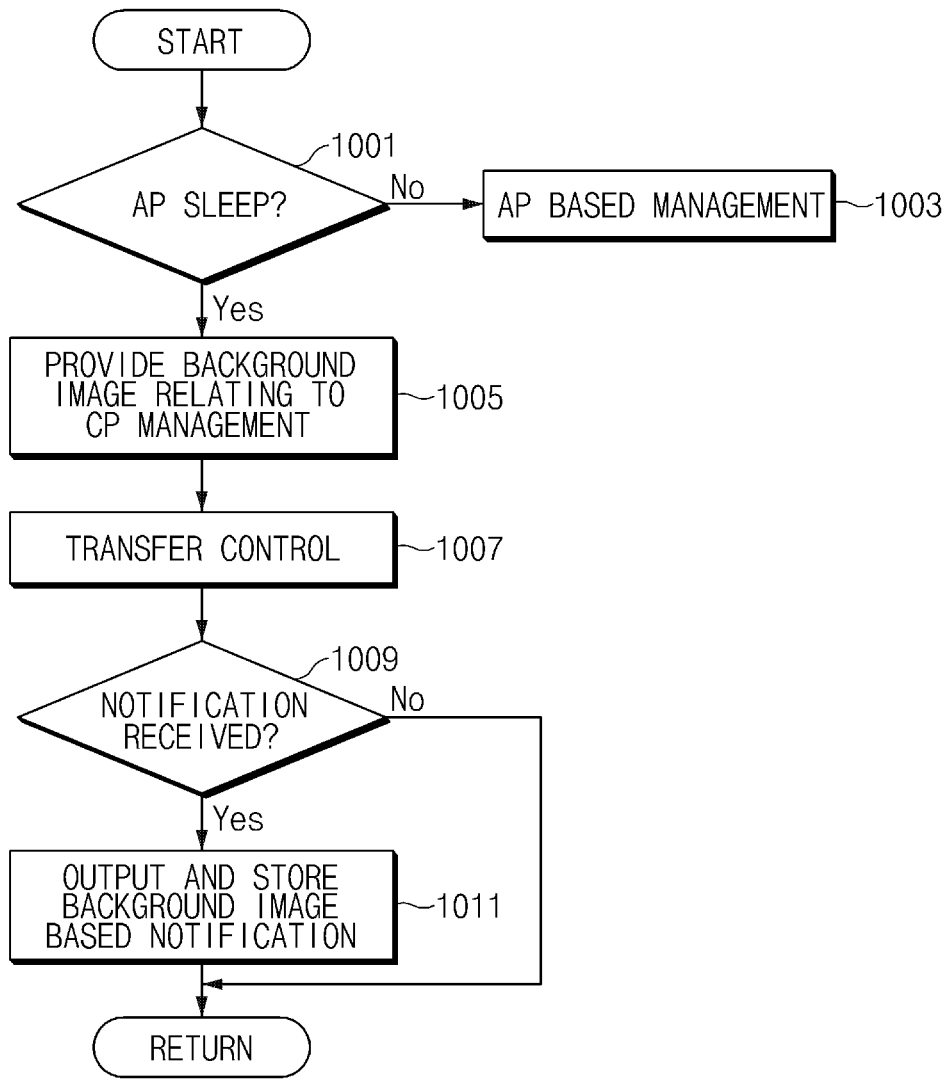
FIG. 10 illustrates an information processing method between processors according to various embodiments of the present disclosure.

FIG. 10 illustrates an information processing method between processors according to various embodiments of the present disclosure.

Referring to FIG. 10, in relation to the information processing method between processors, the electronic device 100 may check whether there is a request relating to a sleep state entry of the AP 30 in operation 1001. If there is no request relating to a sleep state entry, the electronic device 100 may support a management based on the AP 30 in operation 1003. For example, the electronic device 100 may support a user function (for example, a music play function, a video play function, a web access function, and so on) selected by a user input.

If there is the request relating to a sleep state entry of the AP 30, the electronic device 100 may provide a background image relating to a management of the CP 20 in correspondence to a control of the AP 30 in operation 1005. The background image, for example, may include an additional area where an additional image is disposed in at least a partial area. According to various embodiments of the present disclosure, the background image may be an image having no separate additional area. In this case, the additional image that the CP 20 generates may be overlaid on the background image and outputted.

In operation 1007, the AP 30 may perform control transfer. For example, the AP 30 may provide to the CP 20 a control relating to a management of at least part of hardware such as the display 150, the audio processing module 143, the vibration module 141, the LED processing module 145, and so on). With the control transfer, the AP 30 may deliver to the CP 20 setting data (for example, a form in which notification information is outputted when notification is received), slim phone book data, and so on.

The CP 20 receiving the control may support a specified function management. For example, the CP 20 may perform at least one of an initialization relating to a management of the display 150, an initialization relating to a management of the audio processing module 143, an initialization relating to a management of the vibration module 141, and an initialization relating to a management of the LED processing module 145.

In operation 1009, according to an embodiment of the present disclosure, the CP 20 may check whether there is a notification reception. When there is a notification reception, the CP 20 may process a background image based notification output and storage in operation 1011. Alternatively, the CP 20 may process a selection image based notification output and storage. If there is no notification reception, the CP 20 may skip operation 1011.

Figure 11:
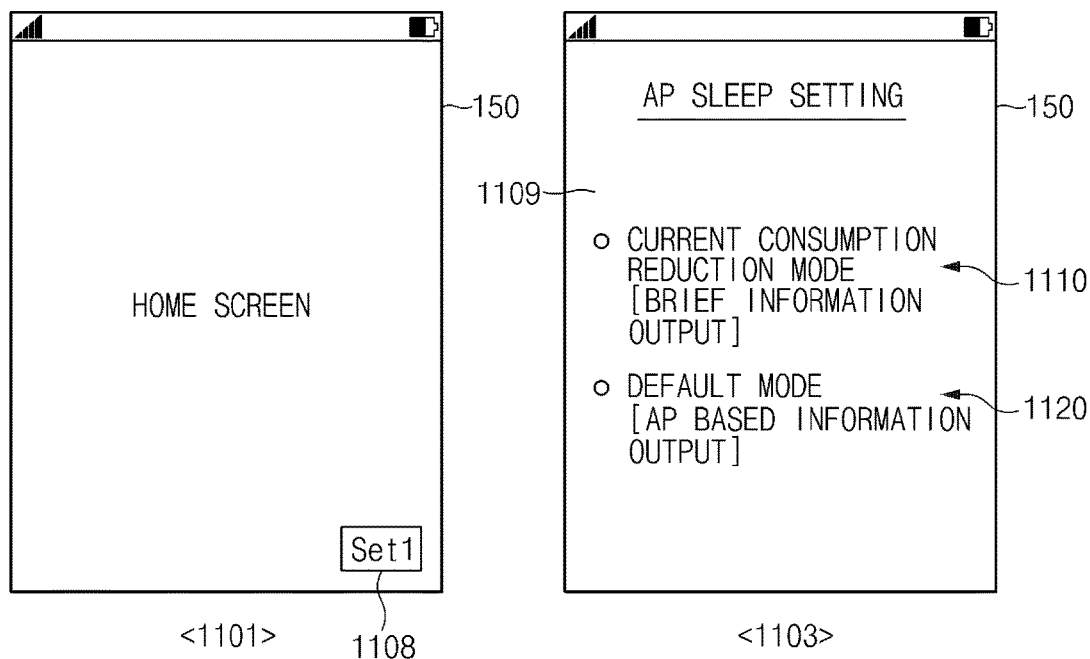
FIG. 11 is a screen relating to a processor setting according to various embodiments of the present disclosure.

FIG. 11 is a screen relating to a processor setting according to various embodiments of the present disclosure.

Referring to FIG. 11, according to various embodiments of the present disclosure, as shown in a state 1101, the electronic device 100 may display a specified screen, for example, a home screen. According to an embodiment of the present disclosure, the electronic device 100 may display a home screen including a setting icon 1108 relating to a sleep setting screen setting. When the setting icon 1108 is selected, the electronic device 100 may display a sleep setting screen 1109 as shown in a state 1103.

The sleep setting screen 1109, for example, may include a current consumption reduction mode item 1110 and a default mode item 1120. Alternatively, the sleep setting screen 1109 may display a screen including 411a and 415a of FIG. 4C. The current consumption reduction mode item 1110 may be an item set to allow the CP 20 to process a function specified when the AP 30 sleeps, for example, a communication event, without waking up the AP 30. According to an embodiment of the present disclosure, when the current consumption reduction mode item 1110 is selected, the electronic device 100 may provide a list of items set to a current consumption reduction mode. For example, the electronic device 100 may provide a list including a call reception item, a text message reception item, a chatting message reception item, an e-mail message reception item, a download completion notification item, and so on.

When the current consumption reduction mode item 1110 is selected, the electronic device 100 may define the frame buffer area 63 of the memory 130, generate the slim phone book 721, and generate setting data in relation to communication event processing based on the CP in a sleep state of the AP 30. Additionally, when the AP 30 enters a sleep state, the electronic device 100 may generate a background image to be provided to the CP 20 or at least one selection image (at least one image to be registered to the frame buffer 400b of FIG. 4). In relation to this, the electronic device 100 may display, on a display, candidates for a plurality of background images to be provided or at least one selection image to support a user to select one.

The background image or at least one selection image may include text or may be replaced with text. Additionally, when the AP 30 enters a sleep state, the electronic device 100 may process a setting of a control transfer relating to controls of at least part of hardware of the CP 20.

According to an embodiment of the present disclosure, when the current consumption reduction mode item 1110 is selected, the electronic device 100 may provide a list of items set to a current consumption reduction mode. Additionally, the electronic device 100 may provide a back ground image relating to communication event notification processing of the CP 20 or at least one selection image setting screen. The image setting screen may provide at least one candidate image to be selected by a user or may be provided to generate an image including at least part of a specific image or text by a user input.

When a communication event is received in a sleep state of the AP 30, the default mode item 1120 may be an item set to wake up the AP 30 and perform processing on the basis of the AP 30. While the current consumption reduction mode item 1110 is selected, if the default mode item 1120 is selected, the electronic device 100 may process the number of the frame buffer areas 63 of a memory allocated in relation to a management of the CP 20, the deletion of the slim phone book 721, and the deletion of setting data.

As mentioned above, according to various embodiments of the present disclosure, an information processing method may include receiving data (for example, a communication event) when a first processor (for example, an application processor) is in a sleep state and outputting information to be outputted according to the received communication event through at least one display when the application processor is in a sleep state.

According to various embodiments of the present disclosure, the outputting of the output information may include outputting a background image provided before the application processor enters a sleep state and an additional image generated according to the communication event type as the output information.

According to various embodiments of the present disclosure, the outputting of the output information may include outputting an image obtained by disposing the additional image in an additional area disposed in the background image or outputting information obtained by overlaying the additional image on the background image.

According to various embodiments of the present disclosure, the outputting of the output information may include generating an additional image according to the communication event reception on the basis of phone book information provided before the application processor enters a sleep state.

According to various embodiments of the present disclosure, the outputting of the output information may include outputting as the output information a selection image corresponding to the communication event type among at least one selection image provided before the application processor enters a sleep state.

According to various embodiments of the present disclosure, the outputting of the output information may include processing a notification setting including at least one the type and output form of the communication event notification on the basis of setting data provided before the application processor enters a sleep state.

According to various embodiments of the present disclosure, the method may further include outputting the setting data setting screen relating to the notification setting performed when the application processor is in a sleep state.

According to various embodiments of the present disclosure, the method may further include storing notification data according to a communication event received when the application processor is in a sleep state.

According to various embodiments of the present disclosure, the method may further include sharing the stored notification data with the application processor when the application processor is activated.

According to various embodiments of the present disclosure, the method may further include at least one of outputting specified audio data corresponding to the communication event type through an audio data processing module, outputting a vibration corresponding to a vibration pattern specified in correspondence to the communication event type, and controlling a lamp output corresponding to a lamp pattern or color specified in correspondence to the communication event type.

Figure 12:
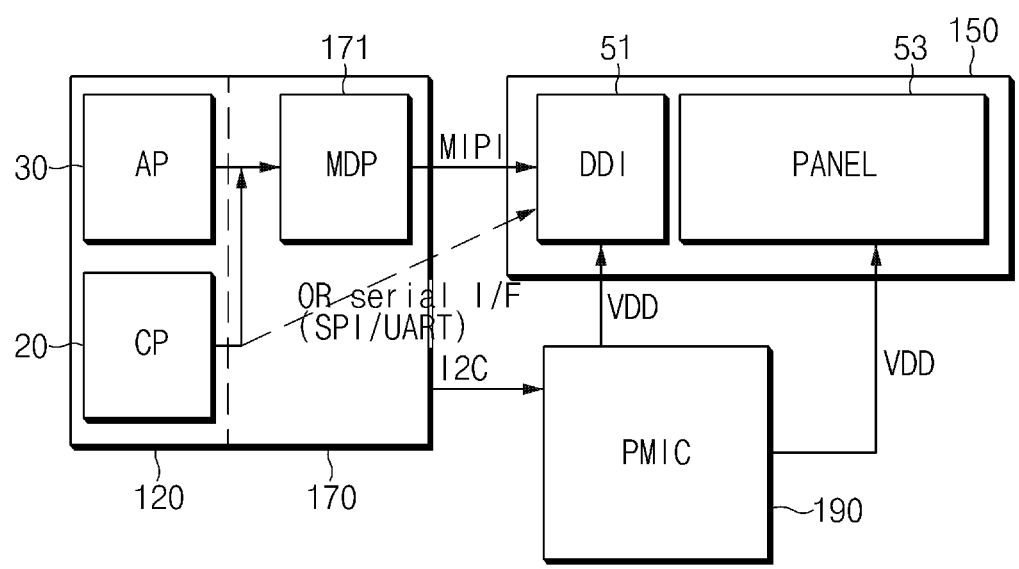
FIG. 12 illustrates an information processing related display management according to various embodiments of the present disclosure.

FIG. 12 illustrates an information processing related display management according to various embodiments of the present disclosure.

Referring to FIG. 12, according to various embodiments of the present disclosure, in relation to an information processing related display management, the electronic device 100 may include a processor 120 including an AP 30 and a CP 20, a renderer 170 including a media acceleration device 171, a display 150 including a DDI 51 (for example, the hardware controller 83 or the display control module 51) and a display panel 53, and a PMIC 190. The media acceleration device 171 may transmit data to the DDI 51 on the basis of a specified communication interface (for example, an MIPI).

The AP 30 in an activation state may perform the screen processing of the display 150 on the basis of the media acceleration device 171. According to various embodiments of the present disclosure, when the AP 30 is in a sleep state, the CP 20 may perform the screen processing of the display 150 on the basis of the media acceleration device 171. According to various embodiments of the present disclosure, the CP 20 may include an interface (for example, a serial interface, SPI, and UART) connected to the DDI 51. The CP 20 may perform screen processing according to a communication event reception by controlling the DDI 51 without going through the media acceleration device 171.

The PMIC 190 may communicate (for example, I2C) with the processor 120 or the renderer 170. The PMIC 190 may control the power supply of the DDI 51 and the display panel 53 in correspondence to a control of the processor 120.

Figure 13:
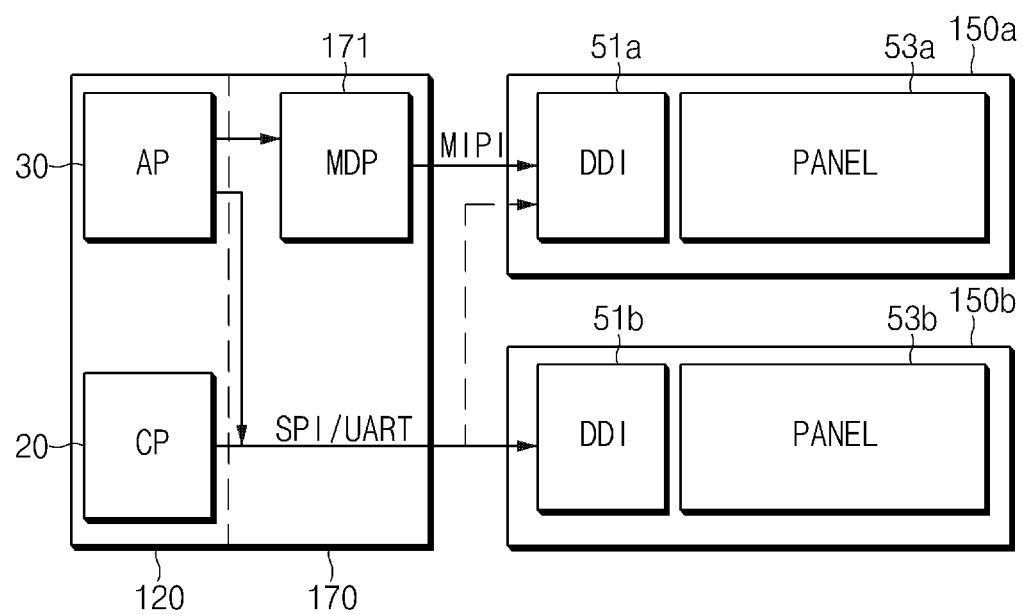
FIG. 13 illustrates an information processing related multi display management according to various embodiments of the present disclosure.

FIG. 13 illustrates an information processing related multi display management according to various embodiments of the present disclosure.

Referring to FIG. 13, in relation to the information processing related multi display management, the electronic device 100 may include a processor 120 including an AP 30 and a CP 20, a media acceleration device 171, a display 150a, and a display 150b. The display 150a may include a DDI 51a and a display panel 53a. The display 150b may include a DDI 51b and a display panel 53b. Additionally or alternatively, the electronic device 100 may further include a PMIC relating to the power supply of the display 150a and the display 150b. The media acceleration device 171 may transmit data to the DDI 51a on the basis of a specified communication interface (for example, an MIPI).

The AP 30 may perform screen processing of the display 150a through the media acceleration device 171. Additionally, the AP 30 may deliver data to the DDI 51b of the display 150b through a communication interface (for example, SPI, UART, and so on).

The CP 20 may deliver data to the DDI 51b of the display 150b through a communication interface (for example, SPI, UART, and so on). Accordingly, the CP 20 may perform only the control of the display 150b when the AP 30 is in a sleep state. According to an embodiment of the present disclosure, when the AP 30 is in a sleep state, the display 150a may be in a sleep state (for example, a power turn-off state). When the AP 30 is in a sleep state, the CP 20 may perform screen processing corresponding to a communication event reception through the display 150b.

According to various embodiments of the present disclosure, the CP 20 may perform a control of the DDI 51a of the display 150a. According to an embodiment of the present disclosure, when the AP 30 is in an activation state, the CP 20 may perform a specific information output on the DDI 51a in correspondence to a control of the AP 30. Alternatively, when the AP 30 is in a sleep state, the CP 20 may output information specified according to a setting to the DDI 51a. According to various embodiments of the present disclosure, when the AP 30 is in a sleep state, the CP 20 may output at least part of information specified according to a setting to the DDI 51a and output at least part of the remaining information to the DDI 51b.

Figure 14:
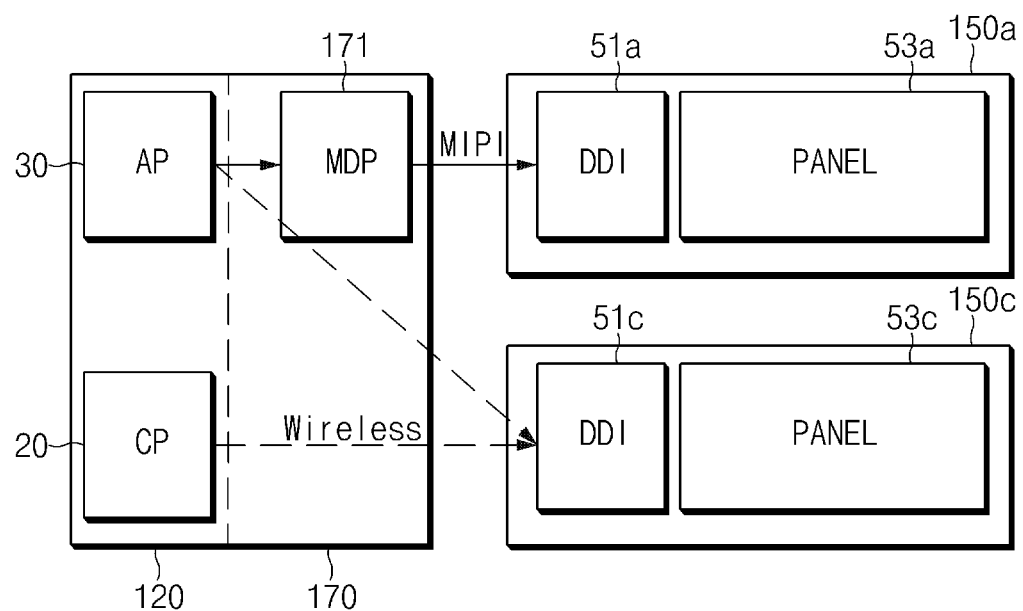
FIG. 14 illustrates information processing related multi device management according to various embodiments of the present disclosure.

FIG. 14 illustrates information processing related multi device management according to various embodiments of the present disclosure.

Referring to FIG. 14, in relation to the information processing related multi device management, the electronic device 100 may include a processor 120 including an AP 30 and a CP 20, a media acceleration device 171, and a display 150a. The display 150a may include a DDI 51a and a display panel 53a. Additionally or alternatively, the electronic device 100 may further include a PMIC relating to the power supply of the display 150a. The media acceleration device 171 may transmit data to the DDI 51a on the basis of a specified communication interface (for example, an MIPI).

Additionally, the electronic device 100 may include a communication interface communicating with another electronic device including a display 150c. Additionally, the other electronic device 102 may include the display 150c and a communication interface (for example, a wireless communication module or a wired communication module) communicating with the electronic device 100. The display 150c may include a DDI 51c and a display panel 53c.

The AP 30 in an activation state may perform the screen processing of the display 150a through the media acceleration device 171. Additionally, the AP 30 in activation state may establish a communication channel with another electronic device and may transmit data to be outputted to the display 150c to another electronic device of the display 150c.

When the AP 30 is in a sleep state, the CP 20 may establish a communication channel (for example, a wireless communication channel) with another electronic device. When the AP 30 in a sleep state receives a communication event, the CP 20 may transmit a specified image (for example, a background image and an additional image, or a selection image) to another electronic device. When the AP 30 is in a sleep state, the other electronic device may display an image received from the CP 20 to the display 150c.

Figure 15:
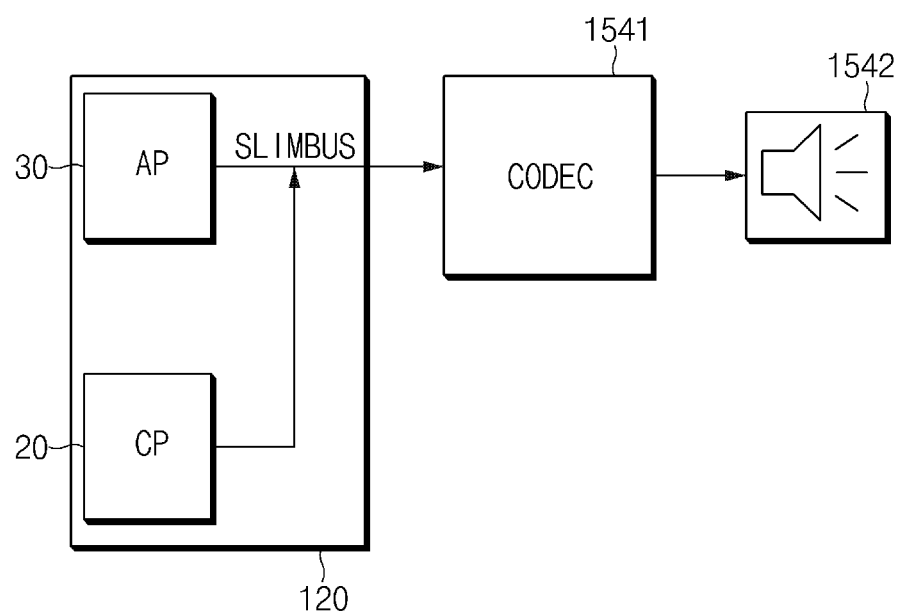
FIG. 15 illustrates an information processing related audio output interface management according to various embodiments of the present disclosure.

FIG. 15 illustrates an information processing related audio output interface management according to various embodiments of the present disclosure.

Referring to FIG. 15, in relation to the information processing related audio output interface management, the electronic device 100 may include a processor 120 including an AP 30 and a CP 20, a codec 1541 (for example, the audio codec 41 of FIG. 2), and a speaker 1542 (for example, the speaker 42 of FIG. 2).

The AP 30 in an activation state may output audio data relating to a user function management to the speaker 1542 through the codec 1541. When the AP 30 enters a sleep state, it may deliver the codec 1541 and a control relating to the speaker 1542 to the CP 20.

When the AP 30 in a sleep state receives a communication event, the CP 20 may perform a control to output specified output information (for example, specified audio data) to the speaker 1542 through the codec 1541. The specified audio data may be identical to audio data outputted according to a communication event when the AP 30 is in an activation state Alternatively, according to a user setting, audio data outputted when the AP 30 is in an activation state and specified audio data outputted according to a control of the CP 20 when the AP 30 is in a sleep state may be different from each other. When the AP 30 is in an activation state, the CP 20 may return a control to the AP 30. The AP 30 and the CP 20 may be connected to the codec 1541 through a communication interface (for example, a slim bus).

Figure 16:
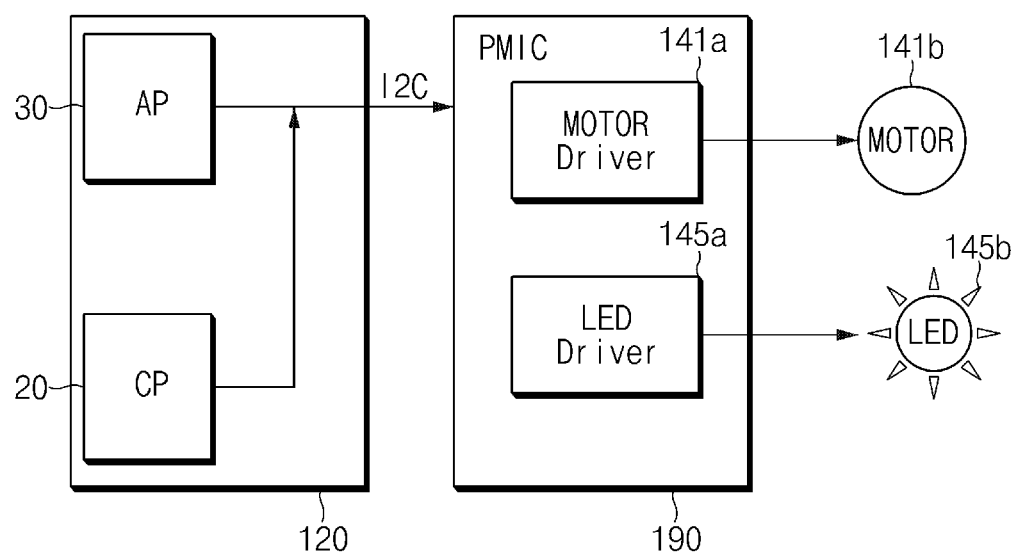
FIG. 16 illustrates an information processing related input/output interface management according to various embodiments of the present disclosure.

FIG. 16 illustrates an information processing related input/output interface management according to various embodiments of the present disclosure.

Referring to FIG. 16, in relation to the information processing related input/output interface management, the electronic device 100 may include a processor 120 including an AP 30 and a CP 20, a PMIC 190, a vibration device 141b, and a lamp 145b. The PMIC 190 may include a vibration driver 141a (for example, the vibration driver 26 of FIG. 3) and an LED driver 145a (for example, the LED driver 27 of FIG. 3). Although the vibration driver 141a or the LED driver 145a is included in the PMIC 190 in this embodiment, various embodiments of the present disclosure are not limited thereto. For example, the vibration driver 141a or the LED driver 145a is prepared as a separated driver IC and may be disposed in an area separated from the PMIC 190. In this case, the vibration driver 141a or the LED driver 145a may perform a vibration pattern implementation or a blinking pattern implementation in correspondence to a control by the AP 30 or the CP 20. During this operation, the AP 30 or the CP 20 may control power supply necessary for a vibrator (for example, a motor) or LED blinking by controlling the PMIC 190.

The AP 30 in an activation state may deliver a vibration pattern according to a communication event reception or a vibration pattern specified according to various event occurrences to the vibration driver 141a of the PMIC 190. Additionally, the AP 30 in an activation state may deliver a specified lamp blinking pattern or color pattern according to a communication event reception or various event occurrences to the LED 145a of the PMIC 190.

According to various embodiments of the present disclosure, when the AP 30 is in a sleep state, the CP 20 may deliver a specified vibration pattern according to a communication event reception to the vibration driver 141a of the PMIC 190. Additionally, when the AP 30 is in a sleep state, the CP 20 may deliver a specified lamp blinking pattern or color pattern according to a communication event reception to the LED driver 145a of the PMIC 190. According to a setting, at least one of a vibration pattern, a lamp blinking pattern, and a color pattern that the CP 20 delivers when the AP 30 is in a sleep state may be identical to or different from at least one of a vibration pattern, a lamp blinking pattern, and a color pattern, which are provided when the AP 30 is activated. The AP 30 and the CP 20 may be connected to the PMIC 190 through a communication interface (for example, I2C).

Figure 17:
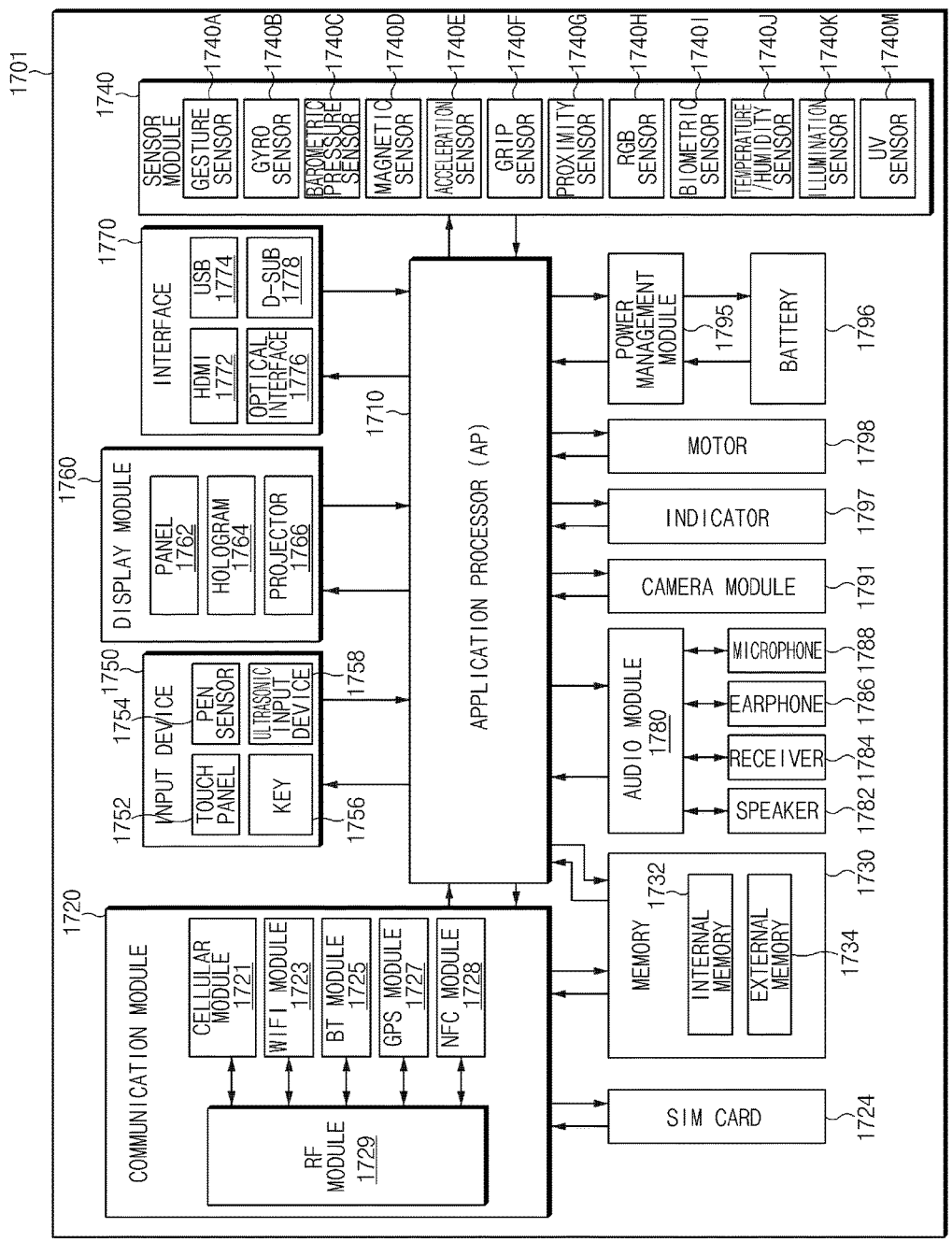
FIG. 17 illustrates an electronic device relating to information processing according to various embodiments of the present disclosure.

FIG. 17 illustrates an electronic device relating to information processing according to various embodiments of the present disclosure.

Referring to FIG. 17, an electronic device 1701, for example, may configure all or part of the above-mentioned electronic device 100 shown in FIG. 1. The electronic device 1701 may include application processor (AP) 1710, a communication module 1720, a subscriber identification module (SIM) card 1724, a memory 1730, a sensor module 1740, an input device 1750, a display 1760, an interface 1770, an audio module 1780, a camera module 1791, a power management module 1795, a battery 1796, an indicator 1797, and a motor 1798.

The AP 1710 may control a plurality of hardware or software components connected to the AP 1710 and also may perform various data processing and operations by executing an operating system or an application program. The AP 1710 may be implemented with a system on chip (SoC), for example. According to an embodiment of the present disclosure, the AP 1710 may further include a graphic processing unit (GPU) (not shown) and/or an image signal processor. The AP 1710 may include at least part (for example, the cellular module 1721) of components shown in FIG. 17. The AP 1710 may load commands or data received from at least one of other components (for example, non-volatile memory) and process them and may store various data in a nonvolatile memory.

The communication module 1720 may have the same or similar configuration to the communication interface 160 of FIG. 1. The communication module 1720 may include a cellular module 1721, a WiFi module 1723, a BT module 1725, a GPS module 1727, an NFC module 1728, and a radio frequency (RF) module 1729.

The cellular module 1721, for example, may provide voice call, video call, text service, or internet service through communication network. According to an embodiment of the present disclosure, the cellular module 1721 may perform a distinction and authentication operation on an electronic device 1701 in a communication network by using a subscriber identification module (for example, the SIM card 1724). According to an embodiment of the present disclosure, the cellular module 1721 may perform at least part of a function that the AP 1710 provides. According to an embodiment of the present disclosure, the cellular module 1721 may further include a communication processor (CP).

Each of the WiFi module 1723, the BT module 1725, the GPS module 1727, and the NFC module 1728 may include a processor for processing data transmitted/received through a corresponding module. According to an embodiment of the present disclosure, at least part (for example, at least one) of the cellular module 1721, the WiFi module 1723, the BT module 1725, the GPS module 1727, and the NFC module 1728 may be included in one integrated chip (IC) or IC package.

The RF module 1729, for example, may transmit/receive communication signals (for example, RF signals). The RF module 1729, for example, may include a transceiver, a power amp module (PAM), a frequency filter, a low noise amplifier (LNA), or an antenna. According to another embodiment of the present disclosure, at least one of the cellular module 1721, the WiFi module 1723, the BT module 1725, the GPS module 1727, and the NFC module 1728 may transmit/receive RF signals through a separate RF module.

The SIM card 1724 may include a card including a SIM and/or an embedded SIM and also may include unique identification information (for example, an integrated circuit card identifier (ICCID)) or subscriber information (for example, an international mobile subscriber identity (IMSI)).

The memory 1730 (for example, the memory 130) may include an internal memory 1732 or an external memory 1734. The internal memory 1732 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory).

The external memory 1734 may further include flash drive, for example, compact flash (CF), secure digital (SD), micro Micro-SD, Mini-SD, extreme digital (xD), or a memorystick. The external memory 1734 may be functionally and/or physically connected to the electronic device 1701 through various interfaces.

The sensor module 1740 measures physical quantities or detects an operating state of the electronic device 1701, thereby converting the measured or detected information into electrical signals. The sensor module 1740 may include at least one of a gesture sensor 1740A, a gyro sensor 1740B, a barometric pressure sensor 1740C, a magnetic sensor 1740D, an acceleration sensor 1740E, a grip sensor 1740F, a proximity sensor 1740G, a color sensor 1740H (for example, a red, green, blue (RGB) sensor), a biometric sensor 1740I, a temperature/humidity sensor 1740J, an illumination sensor 1740K, and an ultra violet (UV) sensor 1740M. Additionally or alternatively, the sensor module 1740 may include an E-nose sensor, an electromyography (EMG) sensor, an electroencephalogram (EEG) sensor, an electrocardiogram (ECG) sensor, an infra red (IR) sensor, an iris sensor, or a fingerprint sensor. The sensor module 1740 may further include a control circuit for controlling at least one sensor therein. According to an embodiment of the present disclosure, the electronic device 1701 may further include a processor configured to control the sensor module 1740 as part of or separately from the AP 1710 and thus may control the sensor module 1740 while the AP 1710 is in a sleep state.

The input device 1750 may include a touch panel 1752, a (digital) pen sensor 1754, a key 1756, or an ultrasonic input device 1758. The touch panel 1752 may use at least one of capacitive, resistive, infrared, or ultrasonic methods, for example. Additionally, the touch panel 1752 may further include a control circuit. The touch panel 1752 may further include a tactile layer to provide tactile response to a user.

The (digital) pen sensor 1754, for example, may include a sheet for recognition as part of a touch panel or a separate sheet for recognition. The key 1756 may include a physical button, an optical key, or a keypad, for example. The ultrasonic input device 1758 may check data by detecting sound waves through a microphone (for example, a microphone 1788) in the electronic device 1701 through an input tool generating ultrasonic signals.

The display 1760 (for example, the display 150) may include a panel 1762, a hologram device 1764, or a projector 1766. The panel 1762 may have the same or similar configuration to the display 150 of FIG. 1. The panel 1762 may be implemented to be flexible, transparent, or wearable, for example. The panel 1762 and the touch panel 1752 may be configured with one module. The hologram 1764 may show three-dimensional images in the air by using the interference of light. The projector 1766 may display an image by projecting light on a screen. The screen, for example, may be placed inside or outside the electronic device 1701. According to an embodiment of the present disclosure, the display 1760 may further include a control circuit for controlling the panel 1762, the hologram device 1764, or the projector 1766.

The interface 1770 may include a high-definition multimedia interface (HDMI) 1772, a universal serial bus (USB) 1774, an optical interface 1776, or a D-subminiature (sub) 1778, for example. The interface 1770, for example, may be included in the communication interface 160 shown in FIG. 1. Additionally or alternately, the interface 1770 may include a mobile high-definition link (MHL) interface, a secure Digital (SD) card/multi-media card (MMC) interface, or an infrared data association (IrDA) standard interface.

The audio module 1780 may convert sound into electrical signals and convert electrical signals into sounds. At least some components of the audio module 1780, for example, may be included in the input/output interface 140 shown in FIG. 1. The audio module 1780 may process sound information inputted/outputted through a speaker 1782, a receiver 1784, an earphone 1786, or a microphone 1788.

The camera module 1791, as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 1795 may manage the power of the electronic device 1701. According to an embodiment of the present disclosure, the power management module 1795 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 1796, or a voltage, current, or temperature thereof during charging. The battery 1796, for example, may include a rechargeable battery and/or a solar battery.

The indicator 1797 may display a specific state of the electronic device 1701 or part thereof (for example, the AP 1710), for example, a booting state, a message state, or a charging state. The motor 1798 may convert electrical signals into mechanical vibration and may generate vibration or haptic effect. Although not shown in the drawings, the electronic device 1701 may include a processing device (for example, a GPU) for mobile TV support. A processing device for mobile TV support may process media data according to the standards such as digital multimedia broadcasting (DMB), digital video broadcasting (DVB), or media flow.

Each of the above-mentioned components of the electronic device according to various embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

Figure 18:
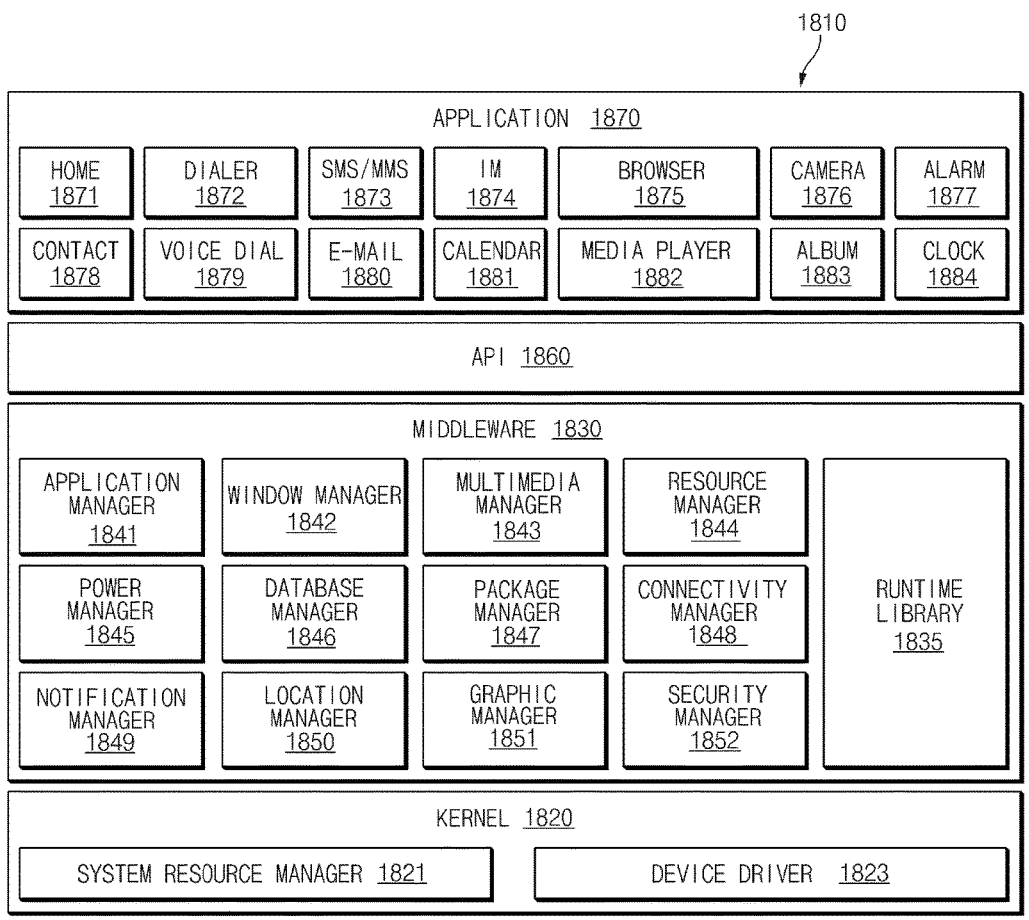
FIG. 18 illustrates a program module according to various embodiments of the present disclosure.

FIG. 18 illustrates a program module according to various embodiments of the present disclosure.

Referring to FIG. 18, according to an embodiment of the present disclosure, the program module 1810 may include an operating system (OS) for controlling a resource relating to an electronic device (for example, the electronic device 100) and/or various applications (for example, the application 38) running on the OS. The OS, for example, may include android, iOS, windows, symbian, tizen, or bada.

The program module 1810 may include an OS and an application 1870. The OS may include a kernel 1820, a middleware 1830, and an API 1860. At least part of the program module 1810 may be preloaded on an electronic device or may be downloaded from a server (for example, the server device 104).

The kernel 1820, for example, may include a system resource manager 1821 or a device driver 1823. The system resource manager 1821 may perform the control, allocation, or retrieval of a system resource. According to an embodiment of the disclosure, the system resource manager 1821 may include a process management unit, a memory management unit, or a file system management unit. The device driver 1823, for example, a display driver, a camera driver, a Bluetooth driver, a sharing memory driver, a USB driver, a keypad driver, a WiFi driver, an audio driver, or an inter-process communication (IPC) driver.

The middleware 1830, for example, may provide a function that the application 1870 requires commonly, or may provide various functions to the application 1870 through the API 1860 in order to allow the application 1870 to efficiently use a limited system resource inside the electronic device. According to an embodiment of the disclosure, the middleware 1830 may include at least one of a runtime library 1835, an application manager 1841, a window manager 1842, a multimedia manager 1843, a resource manager 1844, a power manager 1845, a database manager 1846, a package manager 1847, a connectivity manager 1848, a notification manager 1849, a location manager 1850, a graphic manager 1851, and a security manager 1852.

The runtime library 1835, for example, may include a library module that a complier uses to add a new function through a programming language while the application 1870 is running. The runtime library 1835 may perform a function on input/output management, memory management, or an arithmetic function.

The application manager 1841, for example, may mange the life cycle of at least one application among the applications 1870. The window manager 1842 may manage a GUI resource used in a screen. The multimedia manager 1843 may recognize a format for playing various media files and may encode or decode a media file by using the codec corresponding to a corresponding format. The resource manager 1844 may manage a resource such as a source code, a memory, or a storage space of at least any one of the applications 1870.

The power manager 1845, for example, may operate together with a basic input/output system (BIOS) to manage the battery or power and may provide power information necessary for an operation of the electronic device. The database manager 1846 may create, search, or modify a database used in at least one application among the applications 1870. The package manager 1847 may manage the installation or update of an application distributed in a package file format.

The connectivity manger 1848 may manage a wireless connection such as WiFi or Bluetooth. The notification manager 1849 may display or notify an event such as arrival messages, appointments, and proximity alerts. The location manager 1850 may manage location information on an electronic device. The graphic manager 1851 may manage a graphic effect to be provided to a user or a user interface relating thereto. The security manager 1852 may provide various security functions necessary for system security or user authentication. According to an embodiment of the present disclosure, when an electronic device (for example, the electronic device 100) includes a phone function, the middleware 1830 may further include a telephony manager for managing a voice or video call function of the electronic device.

The middleware 1830 may include a middleware module for forming a combination of various functions of the above-mentioned components. The middleware 1830 may provide a module specialized for each type of OS to provide differentiated functions. Additionally, the middleware 1830 may delete part of existing components or add new components dynamically.

The API 1860, for example, as a set of API programming functions, may be provided as another configuration according to OS. For example, in the case of android or iOS, one API set may be provided for each platform and in the case Tizen, at least two API sets may be provided for each platform.

The application 1870 (for example, the application 38) may include at least one application for providing functions such as a home 1871, a dialer 1872, an SMS/MMS 1873, an instant message 1874, a browser 1875, a camera 1876, an alarm 1877, a contact 1878, a voice dial 1879, an e-mail 1880, a calendar 1881, a media player 1882, an album 1883, a clock 1884, health care (for example, measure an exercise amount or blood sugar), or environmental information provision (for example, provide air pressure, humidity, or temperature information).

According to an embodiment of the disclosure, the application 1870 may include an application (hereinafter referred to as "information exchange application") for supporting information exchange between the electronic device (for example, the electronic device 100) and an external electronic device (for example, the electronic device 102). The information exchange application, for example, may include a notification relay application for relaying specific information to the external device or a device management application for managing the external electronic device.

For example, the notification relay application may have a function for relaying to an external electronic device (for example, the electronic device 102) notification information occurring from another application (for example, an SMS/MMS application, an e-mail application, a health care application, or an environmental information application) of the electronic device. Additionally, the notification relay application may receive notification information from an external electronic device and may then provide the received notification information to a user. The device management application, for example, may manage (for example, install, delete, or update) at least one function (turn-on/turn off of the external electronic device itself (or some components) or the brightness (or resolution) adjustment of a display) of an external electronic device (for example, the electronic device 102) communicating with the electronic device, an application operating in the external electronic device, or a service (for example, call service or message service) provided from the external device.

According to an embodiment of the disclosure, the application 1870 may include a specified application (for example, a health care application) according to the property (for example, as the property of an electronic device, when the type of the electronic device is a mobile medical device) of the external electronic device (for example, the electronic device 102). According to an embodiment of the present disclosure, the application 1870 may include an application received from an external electronic device (for example, the server device 104 or the electronic device 102). According to an embodiment of the disclosure, the application 1870 may include a preloaded application or a third party application downloadable from a server. The names of components in the program module 1810 according to the shown embodiment may vary depending on the type of OS.

According to various embodiments of the present disclosure, efficient information processing may be supported on the basis of an adaptive management of processors that manage information processing.

Additionally, according to various embodiments of the present disclosure, power consumption may be reduced based on efficient information processing.

For example, according to various embodiments of the present disclosure, power consumption may be reduced based on efficient processor management relating to communication event processing.

According to various embodiments of the present disclosure, at least part of the program module 1810 may be implemented with software, firmware, hardware, or a combination thereof. At least part of the programming module 1810, for example, may be implemented (for example, executed) by a processor (for example, the AP 1710). At least part of the programming module 1810 may include a module, a program, a routine, sets of instructions, or a process to perform at least one function, for example.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 120) executes an instruction, it may perform a function corresponding to the instruction. The non-transitory computer-readable storage media may include the memory 130, for example.

The non-transitory computer-readable storage media may include hard disks, floppy disks, magnetic media (for example, magnetic tape), optical media (for example, CD-ROM, and DVD), magneto-optical media (for example, floptical disk), and hardware devices (for example, ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

As mentioned above, according to various embodiments of the present disclosure, a computer readable medium includes an instruction executable by at least one processor. The instruction may include receiving a communication event when an application processor is in a sleep state and outputting information to be outputted according to the received communication event through at least one display when the application processor is in a sleep state.

Although the present disclosure has been described with embodiments, various changes and modifications may be suggested to one skilled in the art. It is intended that the present disclosure encompass such changes and modifications as fall within the scope of the appended claims.

What is claimed is:

1. An electronic device comprising:
a first processor;
a communication interface configured to receive a call connection request; and
a second processor configured to:
obtain phone book information and a background image provided before the first processor entered a sleep state if the call connection request is received while the first processor is in the sleep state,
while the first processor is in the sleep state, generate an additional image for notifying the call connection request, the additional image based at least in part on the obtained phone book information; and
display the additional image corresponding to the obtained phone book information, on at least one display, in at least one of: an additional area disposed in the background image, or in an overlay on the background image.

2. The electronic device of claim 1, wherein the second processor is further configured to display a selection image corresponding to a data type among at least one selection image provided before the first processor entered the sleep state.

3. The electronic device of claim 1, wherein the second processor is further configured to process a notification setting to provide setting data, and output a data notification on a basis of setting data provided before the first processor entered the sleep state.

4. The electronic device of claim 3, wherein the second processor is further configured to provide a setting data setting screen relating to the notification setting of a notification to be performed in the sleep state of the first processor.

5. The electronic device of claim 1, wherein the second processor is further configured to store notification data corresponding to data received when the first processor is in the sleep state.

6. The electronic device of claim 5, wherein the second processor is further configured to share the stored notification data with the first processor when the first processor is activated.

7. The electronic device of claim 1, wherein the second processor is further configured to output at least one of:
- specified audio data corresponding to a data type through an audio data processing module,
- a vibration corresponding to a vibration pattern specified in correspondence to a data type, or
- at least one of a lamp pattern and color specified in correspondence to a data type.

8. The electronic device of claim 1, wherein the second processor is further configured to display additional information including an extracted user name relating to a call notification or a message reception notification.

9. An information processing method comprising:
- receiving a call connection request when a first processor is in a sleep state;
- obtaining phone book information and a background image provided before the first processor entered the sleep state;
- while the first processor is in the sleep state, generating, by a second processor different from the first processor, an additional image, for notifying a call connection request, the additional image based at least in part on the obtained phone book information; and
- displaying, by the second processor, the additional image corresponding to the obtained phone book information, on at least one display, in at least one of: an additional area disposed in the background image, or in an overlay on the background image when the first processor is in the sleep state.

10. The method of claim 9, further comprising outputting a selection image corresponding to a data type among at least one selection image provided on the at least one display before the first processor entered the sleep state.

11. The method of claim 9, further comprising processing, by the second processor, a notification setting to provide setting data, and outputting a data notification based on the setting data provided before the first processor entered the sleep state.

12. The method of claim 11, further comprising outputting, by the second processor, a setting data setting screen relating to the notification setting of a notification to be performed in the sleep state of the first processor.

13. The method of claim 9, further comprising storing, by the second processor, notification data corresponding to data received when the first processor is in the sleep state.

14. The method of claim 13, further comprising sharing, by the second processor, the stored notification data with the first processor when the first processor is activated.

15. The method of claim 9, further comprising outputting, by the second processor, at least one of:
- specified audio data corresponding to a data type through an audio data processing module,
- a vibration corresponding to a vibration pattern specified in correspondence to a data type, or
- at least one of a lamp pattern and color specified in correspondence to a data type.

16. The method of claim 9, further comprising displaying, by the second processor, additional information including an extracted user name relating to a call notification or a message reception notification.

* * * * *